(12) United States Patent
Aykroyd et al.

(10) Patent No.: US 9,974,252 B2
(45) Date of Patent: May 22, 2018

(54) AUTOMATED TOWER WITH MANY NOVEL APPLICATIONS

(71) Applicant: Intelligent Growth Solutions Limited, Dundee (GB)

(72) Inventors: Henry Aykroyd, Dundee (GB); Peter Tyrell, Dundee (GB); Lewis Marriott, Dundee (GB); David Scott, Midlothian (GB)

(73) Assignee: Intelligent Growth Solutions Limited, Dundee, Scotland (GB)

( * ) Notice: Subject to any disclaimer, the term of this patent is extended or adjusted under 35 U.S.C. 154(b) by 176 days.

(21) Appl. No.: 15/101,016

(22) PCT Filed: Dec. 4, 2014

(86) PCT No.: PCT/GB2014/053599
§ 371 (c)(1),
(2) Date: Jun. 2, 2016

(87) PCT Pub. No.: WO2015/082924
PCT Pub. Date: Jun. 11, 2015

(65) Prior Publication Data
US 2016/0295820 A1    Oct. 13, 2016

(30) Foreign Application Priority Data
Dec. 4, 2013  (GB) .................................. 1321389.7

(51) Int. Cl.
*A01G 31/00* (2018.01)
*A01G 9/02* (2018.01)
(Continued)

(52) U.S. Cl.
CPC ............. *A01G 31/06* (2013.01); *A01G 1/001* (2013.01); *A01G 7/02* (2013.01); *A01G 7/045* (2013.01);
(Continued)

(58) Field of Classification Search
CPC ........ A01G 31/06; A01G 31/02; A01G 31/04; A01G 7/045; A01G 7/02; A01G 1/001;
(Continued)

(56) References Cited

U.S. PATENT DOCUMENTS

| 2003/0162288 A1 | 8/2003 | Everett | |
| 2012/0060416 A1 | 3/2012 | Brusatore | |
| 2014/0017043 A1* | 1/2014 | Hirai | A01G 31/02 414/267 |
| 2014/0366443 A1* | 12/2014 | Brusatore | A01G 31/06 47/66.7 |
| 2015/0282437 A1* | 10/2015 | Ohara | A01G 7/00 47/66.6 |
| 2017/0055471 A1* | 3/2017 | Ng | A01G 31/047 |

(Continued)

FOREIGN PATENT DOCUMENTS

| CN | 101647386 A | 2/2010 |
| CN | 201674839 U | 12/2010 |

(Continued)

OTHER PUBLICATIONS

International Search Report for PCT/GB2014/053599, dated Feb. 9, 2015.

(Continued)

*Primary Examiner* — Trinh T Nguyen
(74) *Attorney, Agent, or Firm* — Brinks Gilson & Lione

(57) ABSTRACT

There is provided a vertically stacked multi-layer storage system suitable for the provision of temperature and/or humidity controlled storage of materials. There is particularly provided a vertically stacked multi-layer system having suitable lighting for use with any tray, pot, aeroponic and hydroponic plant growing system and apparatus to combine growing in an integrated growth tray having a suitable lighting source located under the growth tray.

19 Claims, 19 Drawing Sheets

(51) Int. Cl.
    *A01G 31/02*     (2006.01)
    *A01G 31/06*     (2006.01)
    *A01G 1/00*     (2006.01)
    *A01G 7/02*     (2006.01)
    *A01G 7/04*     (2006.01)
    *A01G 9/24*     (2006.01)
    *F21V 23/04*     (2006.01)
    *F21Y 115/10*     (2016.01)

(52) U.S. Cl.
    CPC ............... *A01G 9/24* (2013.01); *A01G 9/246* (2013.01); *F21V 23/0471* (2013.01); *F21Y 2115/10* (2016.08); *Y02P 60/216* (2015.11)

(58) Field of Classification Search
    CPC ........ A01G 9/022; A01G 9/023; A01G 9/088; A01G 9/20; A01G 9/24; A01G 9/246; A01G 9/26; A01G 9/14; A01G 9/104; A01G 9/1066
    See application file for complete search history.

(56) References Cited

U.S. PATENT DOCUMENTS

2017/0339846 A1*   11/2017   Lawrence ................ A01G 9/24
2017/0354099 A1*   12/2017   Haughton ................ A01G 9/20

FOREIGN PATENT DOCUMENTS

| DE | 2455219 A1 | 5/1976 |
|----|------------|--------|
| JP | H03232434 | 10/1991 |
| JP | 2000093026 A2 | 4/2000 |
| JP | 2006280252 A2 | 10/2006 |
| WO | 2013113096 A1 | 8/2013 |

OTHER PUBLICATIONS

Combined Search and Examination Report for GB1321389.7, dated Mar. 20, 2014.

* cited by examiner

AUTOMATED TOWER WITH MANY NOVEL APPLICATIONS

CROSS-REFERENCE TO RELATED APPLICATIONS

This application is a National Stage application of International Application No. PCT/GB2014/053599, filed Dec. 4, 2014. This application also claims priority under 35 U.S.C. § 119 to Great Britain Application No. 1321389.7, filed Dec. 4, 2013.

FIELD OF THE INVENTION

The present invention relates to any tray, pot, aeroponic and hydroponic plant growing system involving suitable lighting in a vertically stacked multi-layer system.

The invention also concerns the apparatus to combine growing with a suitable lighting arrangement compatible with plant growth.

The invention also concerns the apparatus to combine growing with a suitable lighting arrangement compatible with plant growth located under each plant growth tray.

The invention also concerns the apparatus to combine growing and a suitable lighting source in an integrated growth and lighting tray.

The present invention relates to a vertically stacked multi-layer storage system suitable for the provision of temperature and/or humidity controlled storage of materials.

The invention also concerns the automation of the vertically stacked system within a clad freestanding storage tower to promote storage efficiency.

The invention also concerns the automation of the vertically stacked system within an un-cladded freestanding storage tower located within a suitable building to promote storage efficiency.

The invention also concerns the apparatus for an internal ventilation system for precise control of temperature and $CO_2$ levels.

The invention also concerns the apparatus for safe, efficient and automated electricity supply connection within the storage tower.

The invention also concerns the provision of automated digital data collection and reporting from both individual storage towers and individual storage trays within storage towers for the monitoring and management of growth parameters in real time.

The invention also concerns the provision of automated digital data collection and reporting from both individual storage towers and individual storage trays within storage towers for the monitoring and management of parameters related to the stored materials in real time.

BACKGROUND OF THE INVENTION

Historically in commercial horticulture, plants have been grown in greenhouses under various forms of lighting, typically HID sodium lamps. These are placed high (typically 2 m) above plants to avoid damage from the large quantities of heat these lamps produce. High density crops, seedlings and other propagated material have typically been grown under fluorescent lamps and stacked vertically in multiple layers. The introduction of light-emitting diode (LED) lighting technology, and in particular the rapid increase in power, efficiency and the reduction in cost, has increased the range of plants viable for commercial horticulture in this multi-layered approach. However, these static multi-layer systems result in plant inaccessibility, as well as restricting available height and lighting apparatus within a fixed structure. In a number of systems a plant is conveyed through static multi-layer systems, which partially improves the access for filling and emptying at each end of the conveyer. However, the height between the layers and the lighting remains inflexible. Further, complex watering systems must be installed and these are inflexible, difficult to maintain and potentially dangerous, particularly alongside lighting that is typically connected to 240 v AC. There is a need to automate this process and reduce the cost of building and operating such multi-layer plant growth systems, whilst taking full advantage of LED lighting technology on a large scale and in a safe environment.

SUMMARY OF THE INVENTION

The present invention comprises an automated vertical storage tower with integrated growth trays and a process for growing plants in one or more of such towers. These trays can be configured to hold hydroponic, aeroponic, tray or pot based plant growing systems, or used purely to support the lighting array. On the underside of the tray, a suitable lighting source is located, and is typically provided by strips of LED lighting.

According to a first aspect of the present invention there is provided an automated multi-layer vertical growth storage tower with integrated growth trays comprising:

- two stacks of single growth tray units wherein a lighting source compatible with plant growth is located under each tray,
- wherein said trays are stored vertically within said twin stacks, wherein said stacks are on either side of a central lift mechanism in the storage tower,
- wherein the growth trays are mechanically transferred between a lift position and a storage position within the tower,
- wherein the growth trays are automatically retrievable from the storage position to a management position wherein the management position is outside of the tower,
- wherein said management position is in alignment with central workstation(s), and
- wherein each central workstation comprises at least one opening on the outside of the tower for access to one or more growth trays.

According to a further aspect the lighting source compatible with plant growth is located under each growth tray and wherein the growth tray has lighting on the underside of the tray base, or the growth tray has an associated skeleton tray having lighting thereon wherein the skeleton tray is co-located underneath the growth tray, or the growth tray has lighting on the underside of the tray base and has an associated skeleton tray having lighting thereon.

According to a further aspect the underside of each tray accommodates a lighting source compatible with plant growth.

According to another aspect the lighting source compatible with plant growth is located under each tray and is provided by means of a skeleton tray located intermediate between the underside of a first tray and the growth area of a second tray.

According to a first aspect of the present invention there is provided an automated multi-layer vertical growth storage tower with integrated growth trays comprising:

two stacks of single growth tray units wherein a lighting source compatible with plant growth is located under each tray,
wherein said trays are stored vertically within said twin stacks,
wherein said stacks are on either side of a central lift mechanism in the storage tower,
wherein the growth trays are mechanically transferred between a lift position and a storage position within the tower,
wherein the growth trays are automatically retrievable from the storage position to a management position wherein the management position is outside of the tower,
wherein said management position is in alignment with central workstation(s), and
wherein each central workstation comprises at least one opening on the outside of the tower for access to one or more growth trays,
wherein the growth trays have lighting on the underside of the tray base, or the growth trays have an associated skeleton tray having lighting thereon wherein the skeleton tray is co-located underneath the growth tray, or the growth trays have lighting on the underside of the tray base and has an associated skeleton tray having lighting thereon or a mixture or combination of such growth trays; and
wherein where one or more growth and co-located skeleton trays are included said growth and co-located skeleton trays are stored in stacks and may be independently moved in and or out of the growth tower as single units.

According to an aspect of the present invention there is provided an automated multi-layer vertical growth storage tower with integrated growth trays comprising:
two stacks of single growth tray units wherein the underside of each tray accommodates a lighting source compatible with plant growth,
wherein said trays are stored vertically within said twin stacks,
wherein said stacks are on either side of a central lift mechanism in the storage tower,
wherein the growth trays are mechanically transferred between a lift position and a storage position within the tower,
wherein the growth trays are automatically retrievable from the storage position to a management position wherein the management position is outside of the tower,
wherein said management position is in alignment with central workstation(s), and
wherein each central workstation comprises at least one opening on the outside of the tower for access to one or more growth trays.

According to a further aspect of the present there is provided a plant growth system comprising one or more automated vertical storage towers according to the first aspect, each with growth trays wherein a lighting source compatible with plant growth is located under each tray and wherein said trays are stored vertically in twin stacks on either side of a central lift mechanism in each storage tower.

According to another aspect there is provided a plant growth system wherein the underside of each tray accommodates a lighting source compatible with plant growth.

According to an aspect there is provided a plant growth system wherein the lighting source compatible with plant growth is located under each tray and is provided by means of a skeleton tray located intermediate between the underside of a first tray and the growth area of a second tray.

According to a yet further aspect of the present there is provided a plant growth system comprising one or more automated vertical storage towers according to the first aspect, each with integrated growth trays wherein the underside of each tray accommodates a lighting source compatible with plant growth and wherein said trays are stored vertically in twin stacks on either side of a central lift mechanism in each storage tower.

These aspects are described in detail hereinafter.

DESCRIPTION OF THE INVENTION

The present invention provides an automated multi-layer vertical growth storage tower with integrated growth trays wherein a lighting source compatible with plant growth is located on or under each tray.

The various means by which the lighting source may be located under each growth tray are detailed hereinafter.

In one aspect the present invention provides an automated vertical storage tower with integrated growth trays wherein the underside of each tray accommodates a lighting source compatible with plant growth and a process for growing plants in one or more of said storage towers.

For the avoidance of doubt, the term "accommodates a lighting source" in relation to the relative location of a lighting source compatible with plant growth and each plant growth tray as defined herein includes: a lighting source which is integral with the underside of each plant growth tray, such as the aspect illustrated in FIGS. 1 and 1; a lighting source which is located under each tray; and a lighting source compatible with plant growth located under each tray and provided by means of a skeleton tray located intermediate between the underside of a first tray and the growth area of a second tray, such as the aspects illustrated in FIGS. 16($a$) and 16($b$).

For the avoidance of doubt where a skeleton tray arrangement is included, the combined growth and lighting unit comprising one or more skeleton trays and growth trays may be stacked in a growth tower as defined herein either in groups of stacked skeleton and growth trays, such as for example where an area of the tower is designated for the growth of plants requiring additional vertical lighting as illustrated in FIG. 16, or one or more stacked skeleton and growth trays may be included in different areas of the growth tower according to the needs of the particular growth system.

Thus the invention provides an automated multi-layer vertical growth storage tower with integrated growth trays wherein a lighting source compatible with plant growth is located under each tray by use of a combined tray and lighting unit selected from a tray having lighting located on the underside of the tray base, a tray having a co-located skeleton tray having lighting thereon, a tray having lighting located on the underside of the tray base and a co-located skeleton tray having lighting thereon and mixtures and combinations thereof.

The present invention provides an automated multi-layer vertical growth storage tower with integrated growth trays wherein a lighting source compatible with plant growth is located under each tray.

The various means by which the lighting source may be located under each growth tray are detailed hereinafter.

According to an aspect an integrated growth tray, or growth tray, or tray-insert, as defined herein is a combined single growth and lighting unit wherein the lighting is located under the growth tray. Illustrations of single growth and lighting tray units suitable for use herein are provided in FIGS. 1 and 3.

According to an aspect an integrated growth tray, or growth tray, or tray-insert, as defined herein is a combined growth and lighting tray apparatus having a growth tray and a skeleton tray for the provision of lighting wherein a skeleton tray is located under the growth tray. Illustrations of combined single growth and lighting tray units suitable for use herein are provided in FIG. 16.

For the avoidance of doubt the lighting source for use in all of the aspects as described herein is LED lighting.

In an automated storage tower according to the present invention, large quantities of these integrated growth trays can be stored vertically in twin stacks either side of the central lift mechanism to provide a multi-layer vertical growth tower storage system comprising two stacks of single growth tray units. The absolute number of growth tray units which can be hosted within any particular storage tower system will be dependent upon the dimensions of the particular storage tray employed, and the capacity of the equipment within the storage tower to manage the total filled-weight of the growth trays as stored, or hosted, therein.

Thus the present invention additionally provides a plant growth system comprising one or more automated vertical storage towers, each with integrated growth trays as defined hereinbefore wherein the underside of each tray accommodates a lighting source compatible with plant growth and wherein said trays are stored vertically in twin stacks on either side of the central lift mechanism in each storage tower.

In the storage position, each growth tray is supported by a pair of support brackets. The central lift mechanism lifts or lowers the arrangement of growth tray units as desired. For introduction of one or more growth trays into the storage tower, the growth tray is placed in front of an opening in the storage tower, and when the sides of the growth trays are in the required position, and in precise alignment with the support brackets, the growth trays are mechanically transferred between the lift position and the storage position and are automatically transferred into the tower. A particular feature of this storage system is that any particular growth tray or series of growth trays can be automatically retrieved from the storage position and returned to a management position in alignment with central workstation(s) or central processing hatch(es) within the storage tower, wherein each central workstation comprises at least one opening which allows for plant or tray management such as monitoring, treatment, planting or filling, emptying, inspection, watering, harvesting and the like. For the avoidance of doubt the opening(s) are of suitable dimensions to enable a growth tray unit to be automatically retrieved from the stack within the tower and pushed outwards into a management position. When in the management position the growth tray is wholly outside of the stack of stored units within the storage tower and this allows for easy access to the whole of the growth tray unit when in this position. The growth tray unit remains in engagement with the support and transfer mechanism at all times, even when in the management position. The opening(s) can be at either side of the tower, or on both sides of the tower. Where the term processing hatch or hatch is used hereinafter this is to be considered to additionally include the term central workstation(s) unless otherwise specified.

The management position is aligned with at least one processing hatch having at least one opening for accessing one or more growth trays.

Thus the present invention additionally provides a plant growth system comprising one or more automated vertical storage towers, each with integrated growth trays wherein the underside of each tray accommodates a lighting source compatible with plant growth, wherein said trays are stored vertically in twin stacks on either side of the central lift mechanism in each storage tower, wherein the growth trays are mechanically transferred between the lift position and the storage position, and wherein the growth trays are automatically retrievable from the storage position to a management position.

According to a further aspect the present invention provides a fully automated process as defined herein wherein the retrieval and return of growth trays to and from one or more processing hatches provides access for monitoring, treatment planting and/or harvesting of plants accommodated thereon.

The following aspects of the automated growth tower in accordance with the present invention are described in relation to aspects wherein the lighting source is an LED lighting source which is provided on the underside of each growth tray.

A particularly useful feature of the growth trays herein having an LED light source, is that by virtue of the lighting source on the underside thereof, the storage tray becomes integrated into the LED design as a complete lighting array. Such LED-based tray-underside light sources include an integral heat sink, and advantageously operate at low voltage DC which allows the wavelength and intensity of the light to be varied on a tray-to-tray basis. In addition the arrangement of the tray provides for automatic connection and disconnection of the lights at the storage position.

The automated tower has an LED light source wherein the power to the light source associated with any particular tray is automatically connected and disconnected with the tray is in the storage position.

Thus the present invention provides a plant growth system comprising one or more automated vertical storage towers, each with integrated growth trays wherein the underside of each tray accommodates a low voltage DC lighting source compatible with plant growth.

Thus the present invention further provides a plant growth system comprising one or more automated vertical storage towers, each with integrated growth trays wherein the underside of each tray accommodates an LED lighting source compatible with plant growth.

Thus the present invention further provides a plant growth system comprising one or more automated vertical storage towers, each with integrated growth trays wherein the underside of each tray accommodates an LED lighting source compatible with plant growth wherein the LED-based tray-underside light sources include an integral heat sink, operating at low voltage DC to enable variation of the wavelength and intensity of the light on a tray-to-tray basis.

According to a further aspect the present invention provides a fully automated plant growth process comprising one or more automated vertical storage towers, each with integrated growth trays wherein the underside of each tray accommodates an LED lighting source compatible with plant growth as defined herein and wherein the retrieval and return of growth trays to and from one or more processing hatches provides access for monitoring, treatment planting and/or harvesting of plants accommodated thereon.

The Applicant has found that a particular advantage of using LED-based tray-underside light sources is to enable the optimisation of the lighting distribution, and especially to provide a grid-like pattern of lighting. Thus, the present invention additionally provides a fully automated plant growth process comprising one or more automated vertical storage towers as defined herein, wherein LED lighting source is adapted to provide a grid-like pattern of lighting.

A suitable lighting source is provided by LED printed circuit board (pcb) strips which can be mounted onto the underside of panels which are then placed into an open tray to provide a tray having an underside lighting assembly. In a preferred aspect herein four insert panels are provided in strip form and then screwed into position to provide said lighting assembly.

Advantageously the growth trays for use herein have one or more transfer lugs located at each end of the underside of each tray. This arrangement is particularly useful for reducing the risk of tray misalignment and associated system issues in respect thereof, for example a misaligned tray could potentially jump the lugs and cause disruption to the smooth running of the tower system.

The operating system in each of said automated vertical storage towers advantageously include means for the provision of synchronisation of the shaft. This may be provided via a timing shaft that synchronises the motors at each side of each tower, or more preferably via a powered shaft having a motor at one side of the shaft for powering the drive mechanism at the other side. The inclusion of such synchronisation means enables the drive chains to be fully synchronised. An advantage of this system incorporating a synchronizing shaft on the transfer system is particularly useful because it obviates the need for expensive sensing equipment and/or tailored controls to ensure that ensure that the tray is perfectly square before the two independent motors move the tray forward. Illustration of such a system incorporating a tray synchronizing shaft and load sharing motors is provided in FIG. 17, and a powered shaft having a single motor is illustrated in FIG. 9.

Thus, according to a further aspect the present invention provides an automated vertical storage tower with integrated growth trays as defined herein wherein the operating system additionally comprises a timing shaft inside the lift that synchronises the motors at each side of the tower. Advantageously the timing shaft maintains the synchronicity of the motors at all times. For the avoidance of doubt this means that the motors remain synchronised during operation of the automated system herein, and in particular when the units are in motion within the system.

Any suitable motor may be utilised in the automated storage towers to provide the power source, or generator to facilitate the lowering of the integrated trays into the storage towers i.e. from the insertion or management position to a storage position. Suitable motor systems for use herein include: squirrel cage motors.

In automated storage tower systems as defined herein which incorporate a suitable electrical power source, such as a squirrel cage motor, the electrical energy is generated into the inverter drive of the cage motor and any excess power is burned off as heat energy on a breaking resistor on the side of the electrical panel. The applicant has additionally developed an energy efficient system wherein, rather than wasting this excess power via heat burning this additional power source is directly distributed between the mechanical operating systems of lift motors in one or more towers. This direct distribution arrangement does not require any further conversion of the electricity is needed. Should it be desirable to lower trays within all the towers at the same time, or at substantially the same time, then the power source has been adapted to incorporate one or more braking resistors which have the capacity to accommodate this excess power, and thereby ensure safe operation of the system.

Thus, according to another aspect the present invention provides a series of automated vertical storage towers, each with integrated growth trays as defined herein, wherein power generated on the downward movement of a tray within one tower in the series is utilised to power the upward movement of another tray going up another tower in the series.

As discussed hereinbefore, this power-sharing system is particularly useful because it addresses the need for system efficiency by recognising the potential of a high power demand from the constant tray movement in a network of towers and provides an innovative solution which utilises the operating principles of the system to off-set the power-load. An example of an electrical regeneration system suitable for use in the automated systems and processes herein is illustrated in the Figures and is discussed in more detail hereinafter.

The storage system is controlled and operated by a computer, which identifies each tray, its contents and lighting configuration, and can retrieve it to the central workstation(s) or processing hatch at any time. The trays can be spaced in their storage position at increments of not less than the height of the tray. The ability to vary the distance between the trays during the growing cycle is a feature of the present invention. For example, for the first few days after sowing and during the germination and early establishment phase, crops can be spaced at one increment, maximising the number of trays per vertical metre. This distance can then be steadily increased incrementally as the crop grows, to maintain the correct distance between the lighting and the top of the crop.

Thus the present invention additionally provides a fully automated system as defined herein wherein a series of growth trays can be hosted within any storage tower, wherein the vertical spacing between one tray and another can be varied throughout the plant growth cycle and therein the minimal vertical spacing between each tray is at least the height of the tray.

Accordingly the present invention provides a process as defined hereinbefore wherein the vertical spacing between one tray and another can be varied throughout the plant growth cycle and therein the minimal vertical spacing between each tray is at least the height of the tray.

The footprint of the growth tower is determined by the size of the trays, with one dimension determined by the tray length, with the other dimension typically being at least three times the width of the tray. The height of the growth tower is determined by the incremental distance between, and number of, the trays when vertically stacked. The growth tower is a safe, robust freestanding structure that can be externally clad and insulated to satisfy Building Regulations.

A network of growth towers placed strategically could then serve as supporting columns for a roof structure placed above in order to cover the processing hatches below and create an internal space sufficiently weather-proofed and insulated to operate as an internal processing area. Alternatively, a free-standing be-spoke enclosure could surround and cover either the entire tower network, or where the towers are suitably clad, then the free-standing be-spoke enclosure could surround and cover the internal area between to towers to provide protection for the tower openings, processing hatches and plant tray management areas.

The present invention allows for very precise control of temperature and $CO_2$ throughout the growing cycle, and significantly more control than is available in a standard greenhouse or static multi-layer system. This is achieved by placing one or more systems for ventilation and cooling inside and/or outside the towers. In the automated system as defined herein cooling air can be directed accurately across the top of each tray, within the storage tower, wherein such cooling air is typically provided by an evaporative cooler placed on the top of the tower. The cooling air can be ducted as required, typically directed down the central lift shaft and exhausted through louvers that are fitted with temperature sensors to achieve the desired temperature. Advantageously, using this method, different temperatures can be achieved at different points in the tower, to suit growth conditions. This method of ventilation is ideally suited to $CO_2$ enhancement, where additional $CO_2$ can be injected into the airstream as appropriate. This will typically increase $CO_2$ from 300-500 parts per million up to 1000-2000 ppm. In the situation where large numbers of towers justify local power generation, typically by gas, the exhaust $CO_2$ would be fed directly into the airstream.

When the towers are unclad inside a building the cooling and CO2 could be for the entire building or if the towers are clad then they could be controlled independently. In hot climates and where scale justifies trigeneration of heat, power and CO2 the opportunity exists to use the waste heat to power absorption chillers. This would enable the entire growing environment to be 'closed' with total control of temperature, humidity and CO2.

Thus the present invention additionally provides a fully automated system according to any aspect as defined herein additionally comprising a system for ventilation and cooling, and wherein said system may be inside or outside the tower(s).

Accordingly the present invention provides a process as defined hereinbefore wherein control of temperature, humidity and $CO_2$ levels is provided by a ventilation and cooling system which may be accommodated inside or outside the tower(s).

As will be appreciated the novel automated storage tower arrangement as provided by herein is suitable for use for both the growth and storage of plants, particularly as the conditions within the towers can be efficiently managed, Thus the invention additionally provides a storage system for the plant materials once they have been grown to the desired degree. As will be readily appreciated the ability to maintain plants in optimal condition for as long as possible is important in commercial operations based on the ability to continuously and reliably supply plants at particular stages or growth or in particular condition.

The novel automated storage tower system as detailed herein is suitable for use in the storage of any materials or mixture of materials. The tower system is a multi-purpose automated storage tower system. Any materials which it is desired to be stored either in bulk or in specified amounts under controlled conditions of temperature and/or humidity can be stored in the fully automated storage tower systems described herein.

According to a further aspect the invention provides a fully automated system for the provision of temperature and/or humidity controlled storage of materials.

Thus the invention additionally provides an automated multi-layer vertical growth storage tower with integrated growth trays suitable for the provision of temperature and/or humidity controlled storage of materials comprising:

two stacks of single storage tray units wherein the underside of each tray can optionally be adapted to accommodate a lighting source, wherein said trays are stored vertically within said twin stacks, wherein said stacks are on either side of a central lift mechanism in the storage tower, wherein the storage trays are mechanically transferred between a lift position and a storage position within the tower, wherein the storage trays are automatically retrievable from the storage position to a management position wherein the management position is outside of the tower, wherein said management position is in alignment with central workstation(s), and wherein each central workstation comprises at least one opening on the outside of the tower for access to one or more storage trays.

According to a further aspect the automated multi-layer vertical growth storage tower with integrated storage trays suitable for the provision of temperature and/or humidity controlled storage of materials comprises single storage trays having LED lighting located on the underside of the storage tray.

For the avoidance of doubt, each aspect of the novel plant and growth system as described herein which relates to the means for the provision of lighting is equally applicable to the storage tray-based system, as are the aspects relating to tower automation, management of conditions within the tower and also the means for provision of power to the lighting within the storage-tray based fully automated towers herein.

As will be appreciated for storage of the vast majority of goods and materials, an automated multi-layer vertical growth storage tower without lighting on or under the storage trays will be the most efficient means for providing storage.

Advantageously the fully automated multi-layer storage tower system herein can provide means for the effective control of temperature and/or humidity in order to provide customised refrigerated or heated storage conditions.

Thus according to a further aspect the present invention provides a fully automated temperature controlled multi-layer storage tower system suitable for storage wherein temperature and/or humidity, and optionally and/or $CO_2$ levels are controlled inside the one or more towers.

Each of the one or more towers as defined herein are provided with a cooling and heating unit and means for exhaustion of the air to ambient and in addition means for addition of $CO_2$ gas or $H_2O$ mist into the airstream within each tower. Any suitable means for air exhaustion may be utilised, such as one or more pairs of automated louvers, or one or more pairs of fans. Where automated louvers are used these may be of any suitable size to enable efficient air release to ambient. In a preferred aspect, said gas or mist is introduced at a point near to the top of each tower, and wherein said air exhaustion means are located on either side of each tower in order to provide efficient air flow, temperature and humidity management.

Thus the present invention additionally provides one or more automated towers according to any aspect described hereinbefore wherein the one or more towers additionally comprises a system for ventilation, $CO_2$ and cooling. The temperature, humidity and $CO_2$ levels are controlled inside the one or more towers.

The operating system for each automated vertical storage growth tower is able to identify and cycle the trays to the processing hatch(es) individually as required. Where a series of towers are provided then the central operating system can provide a series of trays to be provided to a series of hatches to enable efficient plant or tray management. At each hatch, new plants and/or seeds can be prepared, or crops can be harvested. However, it is a particular feature of the invention that the crops can be brought to one location for watering and fertilising, allowing a single watering system to administer multiple trays stored in the present invention vertical storage tower.

The method of watering and irrigation will be dependent upon the nature of the particular crops to be grown in the vertical storage tower system herein, and may involve simple automated overhead irrigation, ebb and flow flooding, or a more sophisticated form of hydroponics or aeroponics. The precise control of irrigation can be achieved by the use of a weigh load cell to calculate water usage between irrigation cycles. The central workstation or hatch allows for plants within any particular tray to be inspected, weighed, sampled and photographed at that one point and monitored remotely via appropriate data capture and reporting systems. As trays are brought to the central processing hatch, the lighting arrangements can also be monitored and recorded remotely. This comprehensive electronic data recording functionality on input variables permits the generation of detailed reports relating to both short-term and long-term plant growth and commercial goals, leading to a long-term continual evolution and optimisation of growing practices, whether on a tray-by-tray, crop-by-crop or tower-by-tower basis. By changing just one growth parameter, comparisons can be made, enabling continuous improvements and evolution of the growing and lighting systems. Further, the electronic nature of the data recording permits remote reporting and management from any global internet-connected location.

The automated vertical storage towers with integrated growth trays defined herein may be used for: the growth and monitoring of a single crop within one or more towers; the growth and monitoring of a series of different crops each hosted within one or more towers arranged in series; for the growth and monitoring of one or more crop within a tower; the growth and monitoring of one or more crops within one or more towers arranged in series.

As will be appreciated, where the storage towers are referred to as being arranged in series, this includes both the parallel arrangement of one or more towers facing each other, as well as an arrangement of two or more towers alongside one another.

Accordingly the present invention additionally provides a process for automated plant growth as defined hereinbefore which cycles growth trays to a processing hatch linked to a computer to monitor and collect data on input parameters including lighting, wavelength frequencies, intensities, photoperiods, and for automatic management of the plant growth process on the basis of said input parameters.

Clearly one or more storage towers as defined herein may be either be hosted inside either a bespoke building or within a suitable pre-existing building. In addition, the one or more towers may be located in an external environment. Where said one or more towers are open to the elements, then to protect the plant growth and storage system, the towers may be externally clad with suitable cladding material. Suitable cladding material for use herein includes: weatherproofing material; and/or insulating material. Any suitable cladding arrangement can be utilised which provides the required degree of weather proofing, and/or insulation in accordance with the particular geographical location of the tower unit, and/or the particular crop being grown.

Where one or more towers is located in an external environment, then, in addition to the protection for the towers, to protect the growth tray units during plant management, and to enable ease of monitoring the tray contents, either the individual processing hatch or hatches may enclose the growth tray units during plant management to allow access from a tower-facing position only, or where more than one towers are arranged in series or in parallel then the access area to, and the processing hatches themselves are suitably protected from the environment, such as for example via an overhead roof or series of porches, or via a bespoke enclosure. FIG. 11 illustrates a series of towers wherein the towers are externally clad and the processing hatches are protected via a roof structure. As will be appreciated additional protection can be provided by enclosing this central area between the tower systems in order to provide an internal environment for plant tray management. Thus the present invention additionally provides an automated system as defined herein having protection for both the storage towers and the plant tray management areas.

According to a yet further aspect the processing hatch or hatches is/are at least as deep as the growth tray units to be stored in any particular tower. Tower systems having an open-access processing hatch are illustrated in FIGS. 8, 9 and 10.

BRIEF DESCRIPTION OF THE DRAWINGS

The preferred embodiment of the inventions will be described with reference to the drawings thereof in which:

FIG. 2(*b*) is an end view of a further preferred embodiment the single unit of FIG. 1 with side wall 4, lugs 33, and base 5, having an additional water-proof planting tray insert located thereon and LED lighting 6 on the underside of the base of the unit 5;

FIG. 2(*c*) is a side view of the preferred embodiment of the single unit of FIG. 2(*a*) 1 with side wall 4, lugs 33, and base 5 and having an additional water-proof planting tray insert located thereon and showing the LED lighting 6 on the underside of the base of the unit 5;

In FIG. 8 single units of FIG. 3 are illustrated, and it will be readily appreciated that the single units of FIG. 1 are also suitable for use in the tower of FIG. 8;

FIGS. 9(a) and 9(b) are front-side views of an alternative embodiment of a vertical storage tower, in un-cladded form housing the single units of FIG. 1 stacked in multiple layers. In FIG. 8 single units of FIG. 1 are illustrated, and it will be readily appreciated that the single units of FIG. 3 are also suitable for use in the tower of FIG. 9. It will also be readily appreciated that the alternative embodiment of FIGS. 9(a) and 9(b) can also incorporate external cladding and cooling means in line with the specific embodiment illustrated in FIG. 8, and alternatively, external cladding and one or more cooling units and louvers as illustrated in FIG. 10;

In FIG. 10, the addition of a cooling unity and louvers;

FIGS. 4, through 8 and 10 to 13, illustrate in greater detail features of the integrated growth and lighting tray system of FIG. 3 and use of such a tray in an automated vertical storage tower arrangement with cooling and $CO_2$ enhancement under digital monitoring and reporting of growth parameter data in accordance with the present invention.

FIGS. 1 and 2, 8 to 11, and 14 and 15 illustrate in greater detail features of the integrated growth and lighting tray system of FIG. 1 and the use of such a tray in an automated vertical storage tower arrangement with cooling and $CO_2$ enhancement under digital monitoring and reporting of growth parameter data in accordance with the present invention.

FIG. 16 illustrates one way in which a skeleton tray may be included into an automated vertical storage tower arrangement by intermediate placement between an upper and a lower growth tray unit.

As will be appreciated, whilst each of these features are illustrated in association with particular tray and tower arrangements, these features may be combined with any of the particular systems and/or processes defined hereinbefore to provide additional aspects of the present invention, and that such aspects are included herein.

In this illustrated embodiment, individual insert trays are hosted upon one or more units. An insert tray as defined herein is a waterproof tray for supporting or holding: one or more seed trays; one or more plant pots; a hydroponic growing system; or an aerophonic growing system.

Figure 1:
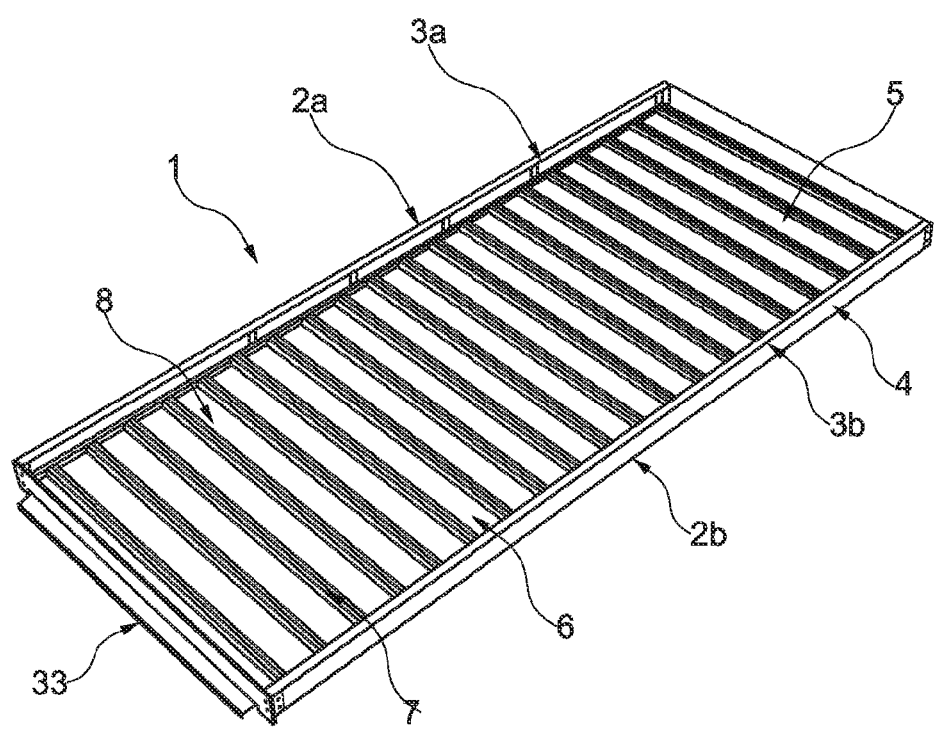
FIG. 1 is an isometric view of a preferred embodiment of a single growth tray unit suitable for use in the present multi-layer vertical growth tower storage system.
Figure 19:
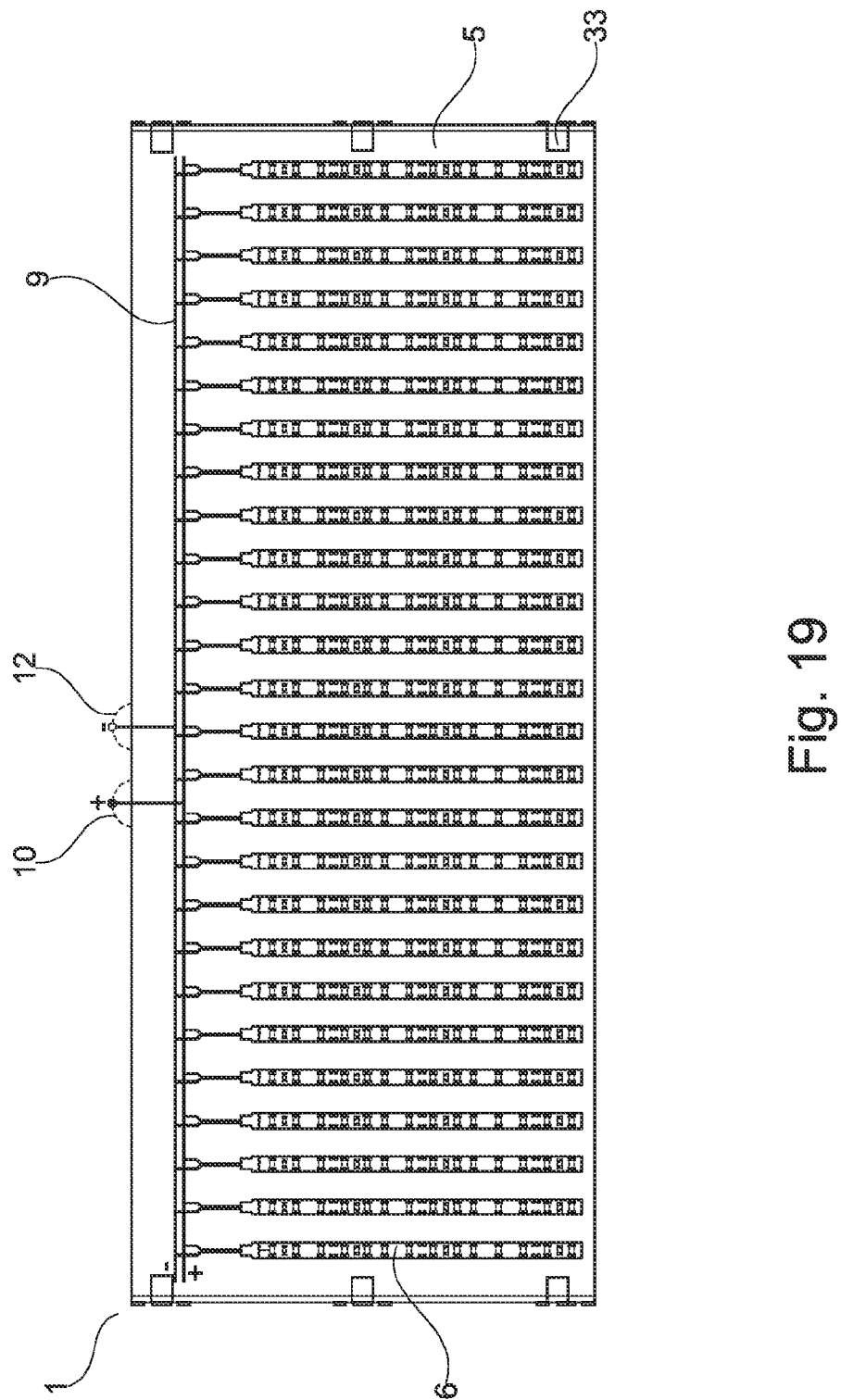
FIG. 19 is a bottom view including lighting strips, busbar, connectors and lugs of an alternative single unit in accordance with FIG. 3.

As illustrated in FIG. 1, each unit 1 has sidewalls 2a and 2b having top edges 3a and 3b at a distance from the bottom edge 4. The bottom edge 4 surrounds a unit base 5 which in turn supports an insert tray (not shown) to hold seed trays, plant pots or a hydroponic or aeroponic growing system. A plurality of LED printed circuit board (pcb) strips 6 each comprising a number of individual LEDs, are mounted onto the underside of the unit base 5, using any suitable means, and typically by use of adhesive thermal tape 7. One or more lugs 33 are provided on the tray. In the particular arrangement illustrated in FIG. 1, a pair of lugs are provided with one being located at either of the tray-ends. As discussed hereinbefore, said lugs may also be located on the underside of the unit at either end of base 5. An alternative embodiment having a different lug arrangement is illustrated in FIG. 19.

This combined assembly of a unit base, and integrated LED strips in the arrangement illustrated in FIG. 1 provides a heat sink for the integrated growth and lighting array.

In an alternative arrangement a unit having the following features as illustrated and described in FIG. 1 is also provided. A unit with sidewalls 2a and 2b having top edges 3a and 3b at a distance from the bottom edge 4. The bottom edge 4 surrounding a unit base 5 which in turn is suitable for supporting an insert tray to hold seed trays, plant pots or a hydroponic or aeroponic growing system. One or more lugs 33 are provided on the tray and said lugs may be provided at either end, as illustrated in FIGS. 1 and 3, or on the sides as illustrated in FIG. 19.

Figure 2:
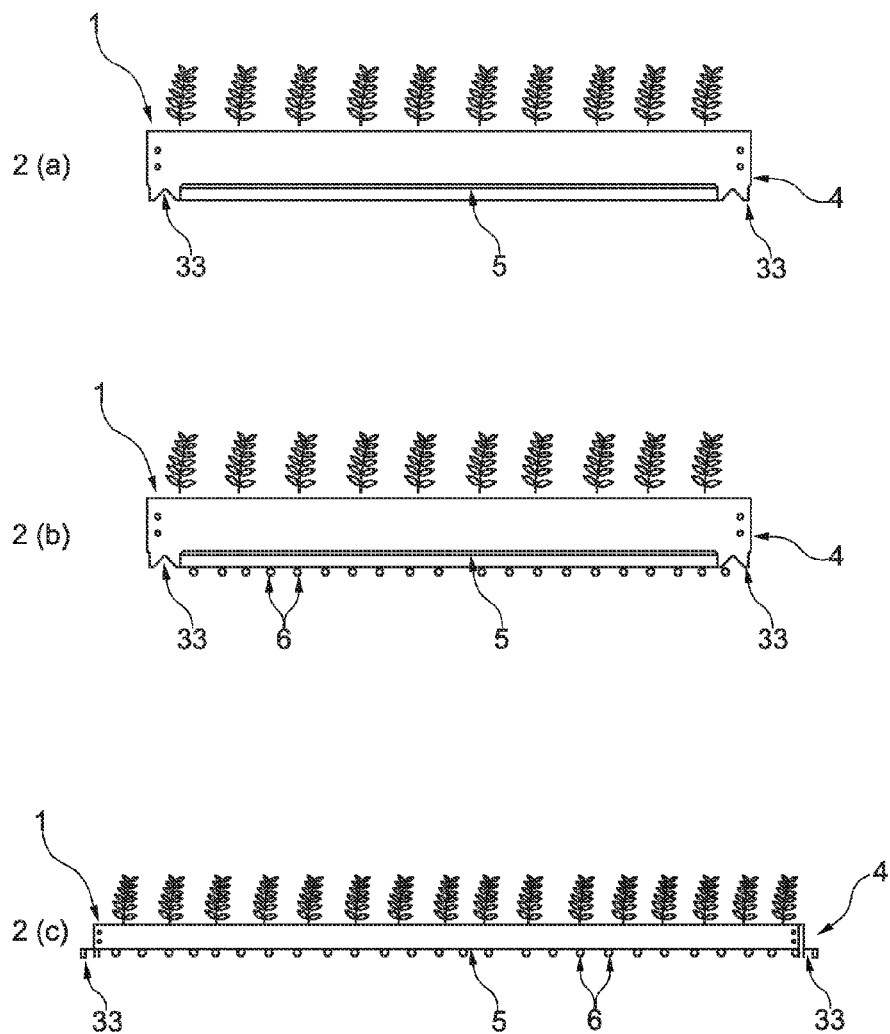
FIG. 2(*a*) is an end view of the single unit of FIG. 1 with side wall 4, lugs 33, and base 5 and having an additional water-proof planting tray insert located thereon.

In FIG. 2 an example of an insert tray with growing plants located upon the unit 1, of FIG. 1 is illustrated, and the relationship between the unit base 5, the pcb strips having LEDS thereon 6 secured by suitable means 7, to the underside of unit base 5 is more clearly defined.

Figure 3:
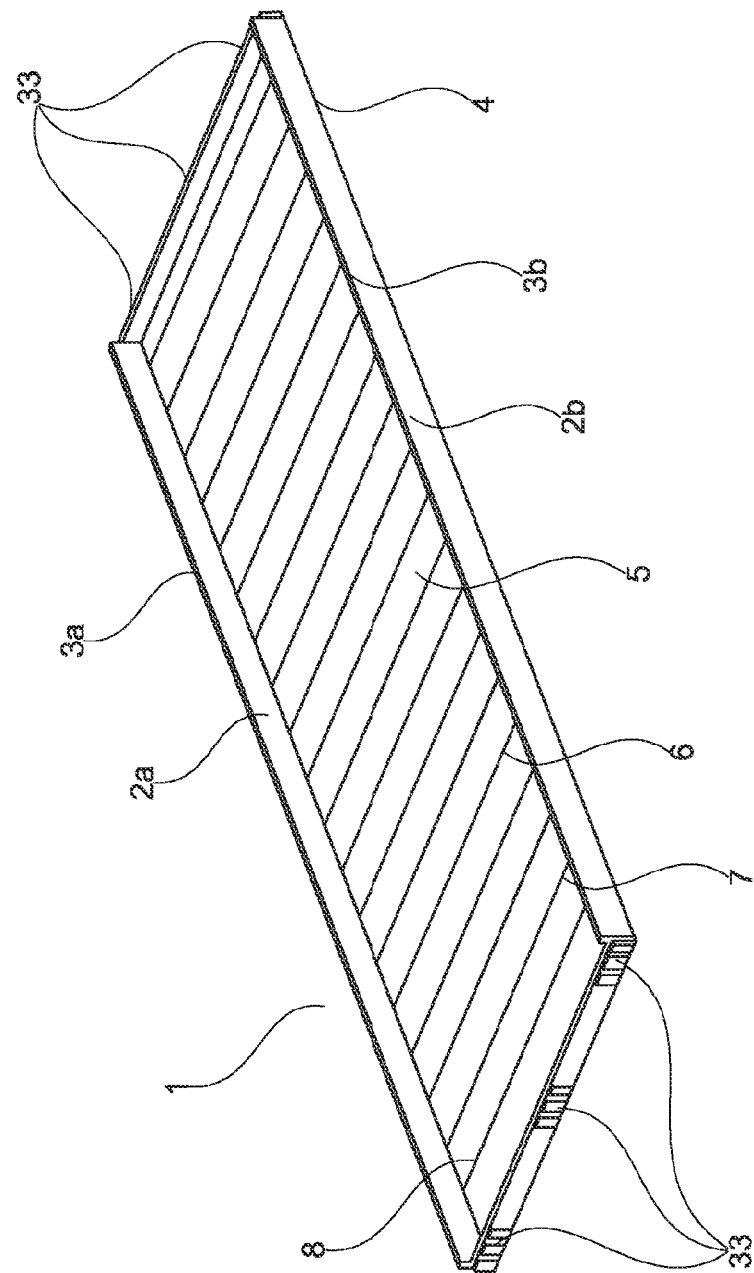
FIG. 3 is an isometric view of an alternative of a single growth and lighting tray unit having LED strips located on the underside of the unit which is also suitable for use in the present multi-layer vertical growth tower storage system.

As illustrated in FIG. 3, each unit 1 has sidewalls 2a and 2b having top edges 3a and 3b at a distance from the bottom edge 4. The bottom edge 4 surrounds a unit base 5 which in turn supports an insert tray (not shown) to hold seed trays, plant pots or a hydroponic or aeroponic growing system. A plurality of LED printed circuit board (pcb) strips 6 each comprising a number of individual LEDs, are mounted onto the underside of the unit base 5, using any suitable means, and typically by use of adhesive thermal tape 7. A number of lugs 33 are provided on the tray. In the particular arrangement illustrated in FIG. 3, a number of said lugs are located at either of the tray-ends.

This combined assembly of a unit base, and integrated LED strips in the arrangement illustrated in FIG. 3 provides a heat sink for the integrated growth and lighting array.

Figure 4:
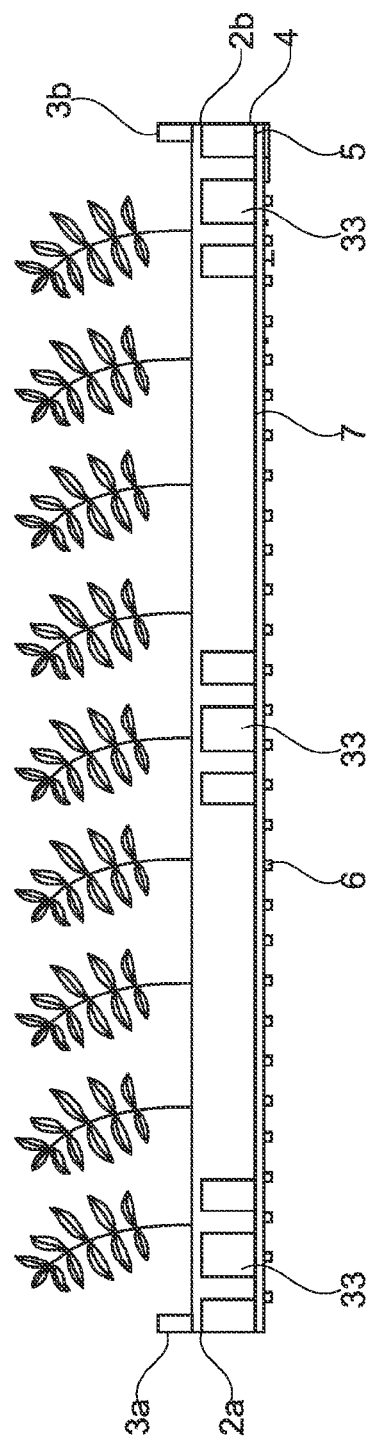
FIG. 4 is a side view of the end of the single unit of FIG. 3 having an additional water-proof planting tray insert located thereon.

In FIG. 4 an example of an insert tray located upon the unit 1, of FIG. 3 is illustrated, and the relationship between the unit base 5, the pcb strips 6 having individual LEDs (not shown) secured by suitable means 7, to the underside of unit base 5 is more clearly defined.

Figure 5:
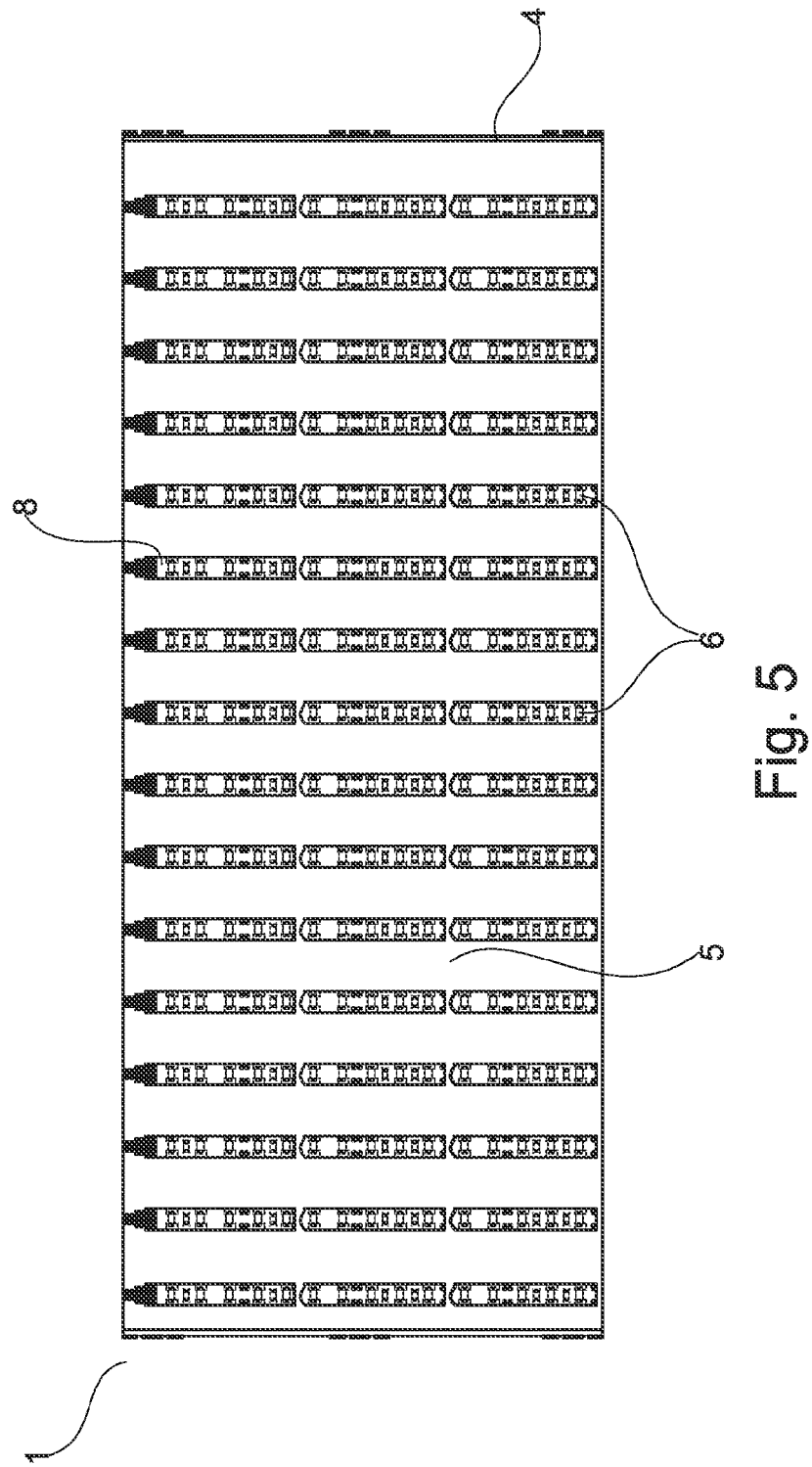
FIG. 5 is a bottom view of an embodiment of a single unit in accordance with FIG. 3 including lighting strips.

Referring to FIG. 5, the integrated growth and lighting tray unit 1 can be assembled with a variable number of LEDs 8 by altering the distance between each LED 8 on the pcb strip 6 and by varying the spacing between the pcb strips 6 to achieve the desired wavelength frequencies and intensities In FIG. 5 the pcb strips 6 are arranged in parallel lines, with each strip extending to essentially the width of the unit base 5, between sides 2a and 2b, and with the series of parallel strips running substantially the entire length of the tray. As will be appreciated the absolute number of LEDs 8 which may be located underneath any particular base 5 will be dependent upon the dimensions of the particular unit 1 and the particular number and arrangement of pcb strips employed in order to generate the desired wavelength frequencies and intensities for the selected plant crop. For the avoidance of doubt, whilst the particular unit illustrated in FIG. 5 has a number of individual lugs located at either end, the LED arrangement described herein and as illustrated in FIG. 5 can be applied to any other unit suitable for use in the automated growth tower herein, and in particular to units having a pair of lugs at either end as illustrated in FIG. 1.

Figure 6:
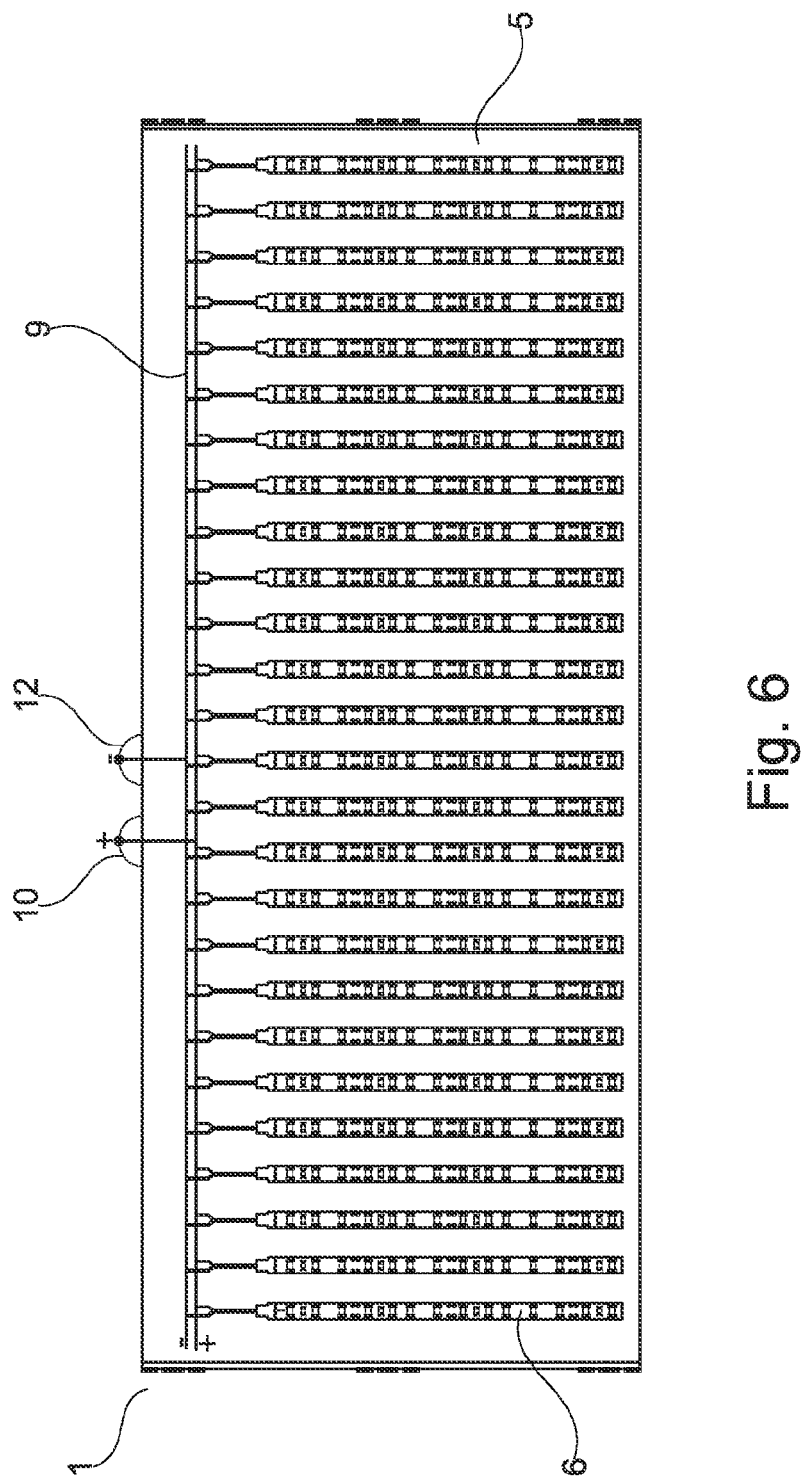
FIG. 6 is a bottom view including lighting strips, busbar and connectors of the embodiment of the single unit of FIG. 3.

Referring to FIG. 6, the electrical supply to the LED-containing pcb strips 6 is provided by a DC low voltage busbar 9 with positive connection 10 and negative connection 12 mounted along substantially the entire length of unit 1. Busbar 9 may be screwed onto the tray, or may be suitably mounted onto or embedded into the tray. For the avoidance of doubt, whilst the particular unit illustrated in FIG. 6 has a number of individual lugs located at either end, the LED arrangement described herein and as illustrated in FIG. 7 can be applied to any other unit suitable for use in the automated growth tower herein, and in particular to units having a pair of lugs at either end as illustrated in FIG. 1.

Figure 7:
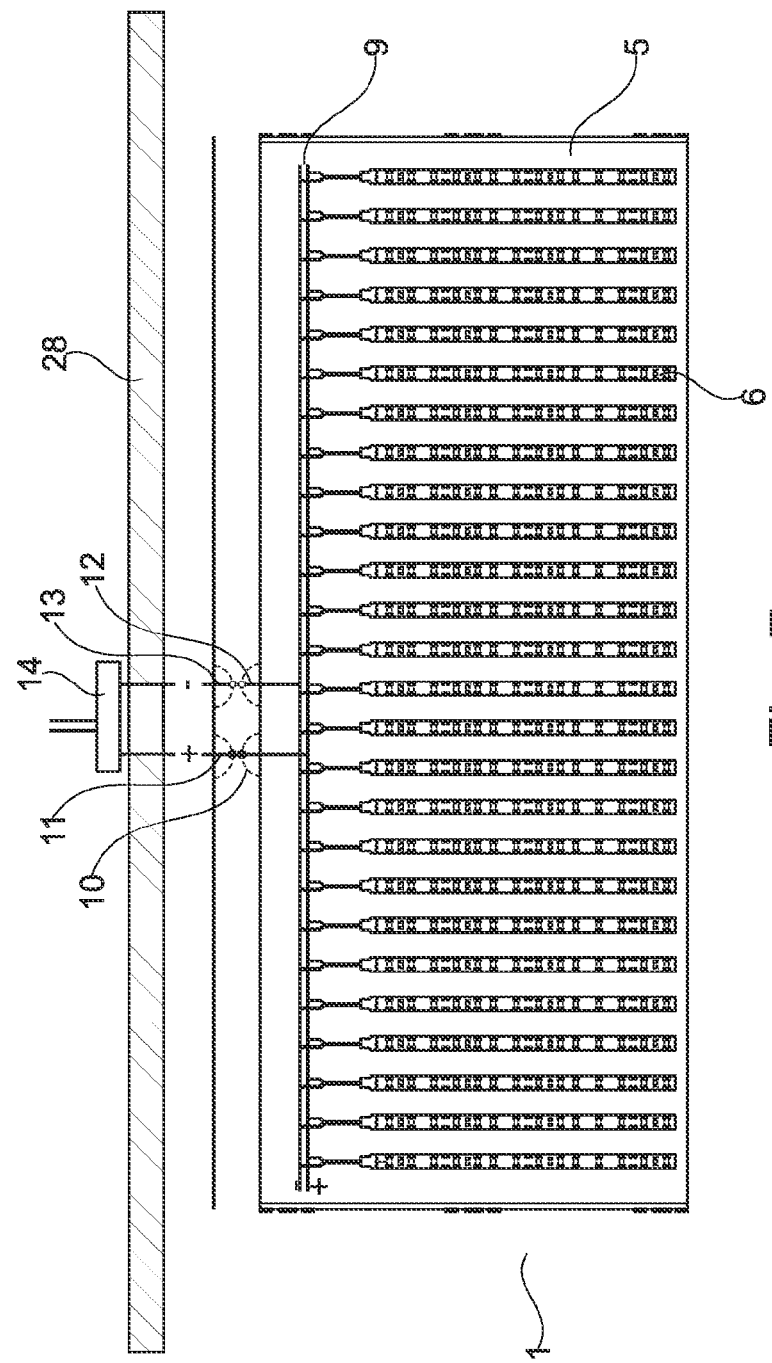
FIG. 7 is a bottom view including lighting strips, busbar, connectors and external inverters and cladding of the embodiment of the single unit of FIG. 3.

Referring to FIG. 7, each tray unit 1 makes a both a positive and a negative low voltage DC connection as it is placed into its storage position within the automated tower (not shown) when electrical contact is made between busbar 9 and connectors 10 and 11 for positive charge, and 12 and 13 for negative charge. This connection system facilitates the automatic switching on of the LED lighting system provided by pcb strips 6 mounted on the underside of 5 of unit 1 when the unit is stored in the tower and automatic switching off of the LED system when the unit is being retrieved from the tower for management. An AC to DC inverter 14 is mounted outside of the tower at point 28 which can be on a cladded external wall of the tower, with the low voltage DC being wired to positive connector 11 and to negative connector 13. For the avoidance of doubt, whilst the particular unit illustrated in FIG. 5 has a number of individual lugs located at either end, the LED arrangement described herein and as illustrated in FIG. 7 can be applied to any other unit suitable for use in the automated growth tower herein, and in particular to units having a pair of lugs at either end as illustrated in FIG. 1.

Figure 8:
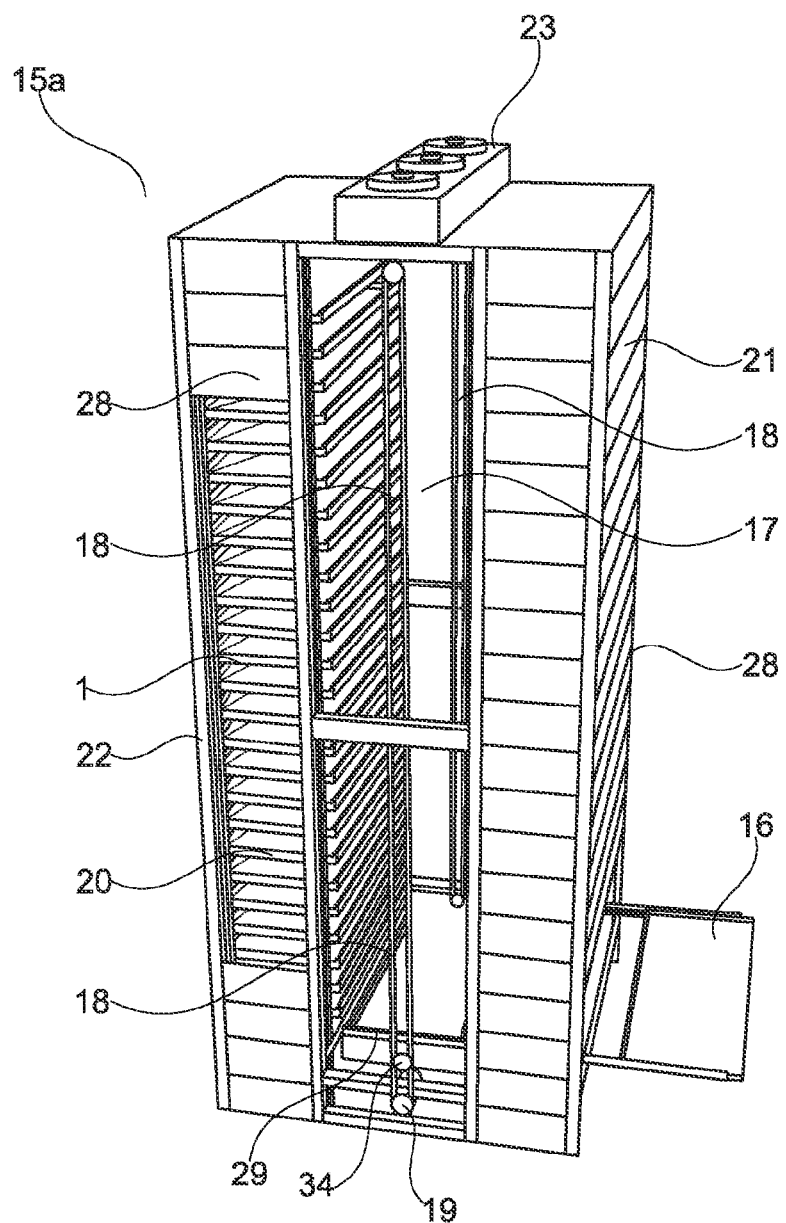
FIG. 8 is an isometric view of an embodiment of a cladded and cooled vertical storage tower housing the single units of FIG. 3 stacked in multiple layers.

Referring to FIG. 8, each tray unit 1 is conveyed from the processing hatch 16 into the central lift shaft 17 within a vertical storage tower 15a that is externally clad with weatherproof, insulating material 28. In this illustration said insulating material is provided onto the tower via a series of horizontal strips. Clearly, any suitable cladding arrangement can be utilised which provides the required degree of weather proofing, and/or insulation in accordance with the particular geographical location of the tower unit, and/or the particular crop being grown. Unit 1 is then lifted vertically by the lift belts 18, onto which the automated tray transfer mechanism unit 29, within the central lift shaft, is fixed to at each side via a pair of clamps 34 (only one illustrated). Transfer of unit 1 to any specified position within the storage tower is powered by a drive motor 19 to locate unit 1 to the desired position in the tower in line with brackets 20. Unit 1 is then transferred into its storage and growth position which may be either in the front-facing stack of storage units 21 or in rear-facing stack of storage units 22 within the tower 15, by the automated tray transfer mechanism 29. For the avoidance of doubt, the terms front-facing and rear-facing are used with reference to their relative location to the central processing hatch 16, those immediately in-line with the hatch are front-facing and those located across from the hatch at the opposite side of the central lift shaft are termed rear-facing. At this point, the electrical connections 10, 11, 12 and 13 on the unit 1 (not shown) are established and the LED lighting 8 on the underside of the unit 1 (not shown) is automatically activated. Each unit 1 is automatically retrievable from the storage tower and returned to the processing hatch 16 as often as is required for the purposes of planting, watering, harvesting, inspection, weighing, photographing and monitoring of the lighting arrays 8. The frequency of such retrieval and management/monitoring is dependent upon the cycle time and the number of trays in the storage tower 15a. A cooling and heating unit 23 is located on a tower cover is additionally illustrated. As will be appreciated, said cooling and heating unit be located either internally or externally as desired and as may be necessary to provide the most efficient levels of control in accordance with either the geographical location of the towers, or the particular crop being grown therein.

Figure 9:
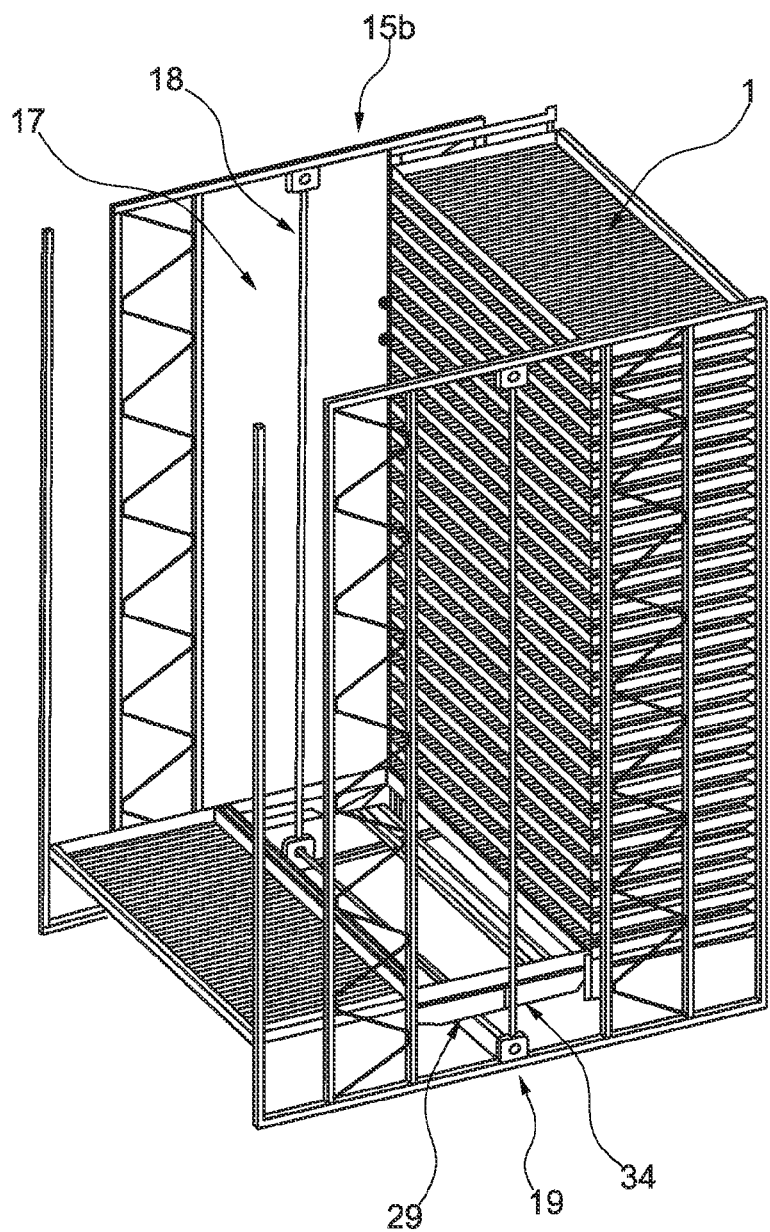

Referring to FIG. 9, each tray unit 1 is conveyed from the processing hatch 16 into the central lift shaft 17 within a vertical storage tower 15b. Unit 1 is then lifted vertically by the lift belts 18, onto which the automated tray transfer mechanism unit 29, within the central lift shaft, is held in position via a pair of clamps 34 (only one illustrated). Transfer of unit 1 to any specified position within the storage tower is powered by a drive motor 19 to locate unit 1 to the desired position in the tower in line with brackets 20. Unit 1 is then transferred into its storage and growth position which may be either in the front-facing stack of storage units 21 or in rear-facing stack of storage units 22 within the tower 15b, by the automated tray transfer mechanism 29. For the avoidance of doubt, the terms front-facing and rear-facing are used with reference to their relative location to a central processing hatch (not shown), those immediately in-line with the hatch are front-facing and those located across from the hatch at the opposite side of the central lift shaft are termed rear-facing. For the avoidance of doubt the electrical arrangements and automatic retrieval aspects as described in relation to the particular arrangement illustrated in FIG. 8 are equally applicable to the tower 15b of FIG. 9.

In the tower 15a of FIG. 8 the central automated tray transfer mechanism includes a solid internal tray onto for movement of the unit to be transferred in/out of the tower, whilst in the tower 15b of FIG. 9 this central mechanism includes a hollow internal tray. As will be appreciated further base arrangements suitable for use herein include mesh or grid-like bases, as well as slatted or other arrangements.

Figure 10:
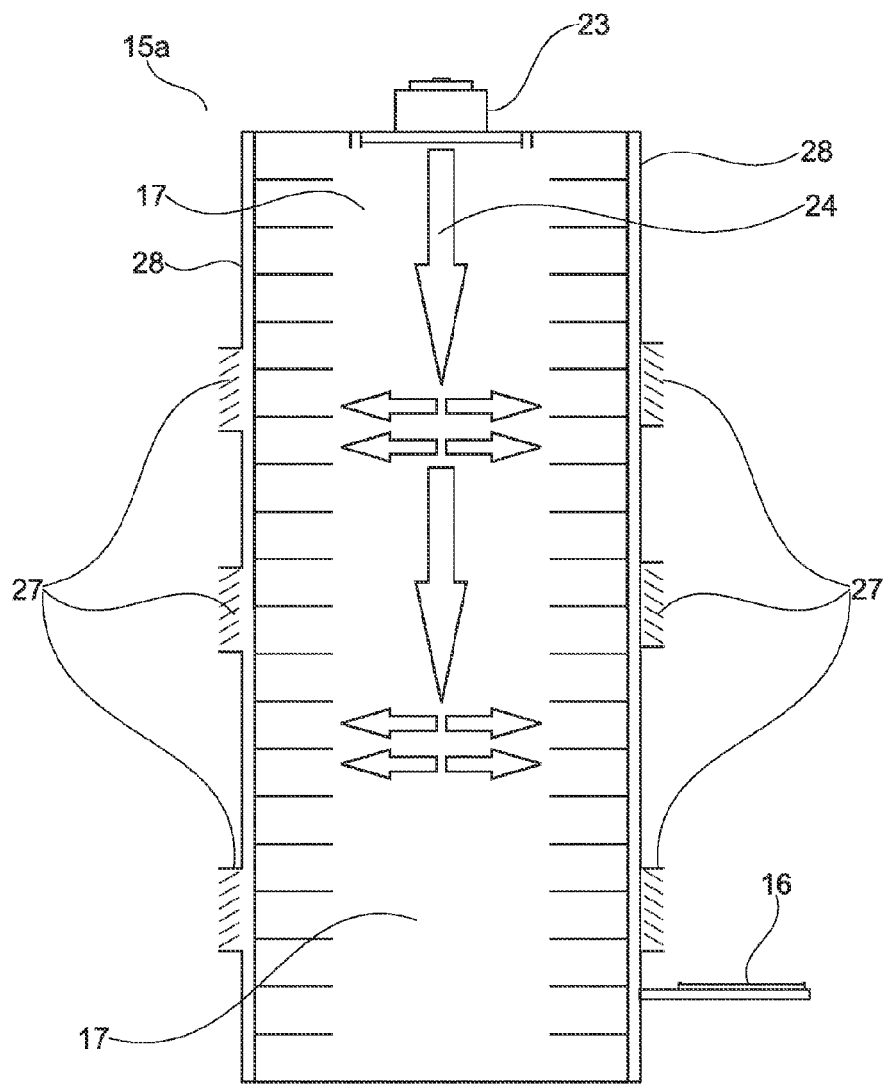
FIG. 10 is a side view including cooling unit and louvers of the preferred embodiment of the vertical storage tower of FIG. 8 housing the single unit of FIG. 3 stacked in multiple layers.

Referring to FIG. 10, the crops growing in the two vertical stacks of trays unit 1 within a cladded and cooled tower unit 15b are maintained at steady temperature by the cooling and heating unit 23. With the cool or warm air being directed vertically down the central lift shaft 17, the air is exhausted to ambient by means of automated louvers, or fans 27 to obtain the desired temperature and humidity levels. Into the airstream at point 24, $CO_2$ or mist can be added to increase $CO_2$ and humidity levels.

Thus according to a further aspect the present invention provides an automated vertical storage tower as defined herein before additionally comprising a cooling and heating unit and means for exhaustion of the air to ambient.

According to a yet further aspect the present invention provides an automated vertical storage tower as defined herein before additionally comprising a cooling and heating unit and means for exhaustion of the air to ambient and means for addition of $CO_2$ gas or $H_2O$ mist into the airstream within the tower, wherein said gas or mist is introduced at a point near to the top of the tower, and wherein said air exhaustion means are located on either side of the tower to allow efficient air flow, temperature and humidity management.

Any suitable means for air exhaustion may be utilised, such as one or more pairs of automated louvers, or one or more pairs of fans 27. Where automated louvers are used these may comprise the external cladding, or these may be of any suitable size to enable efficient air release to ambient.

Figure 11:
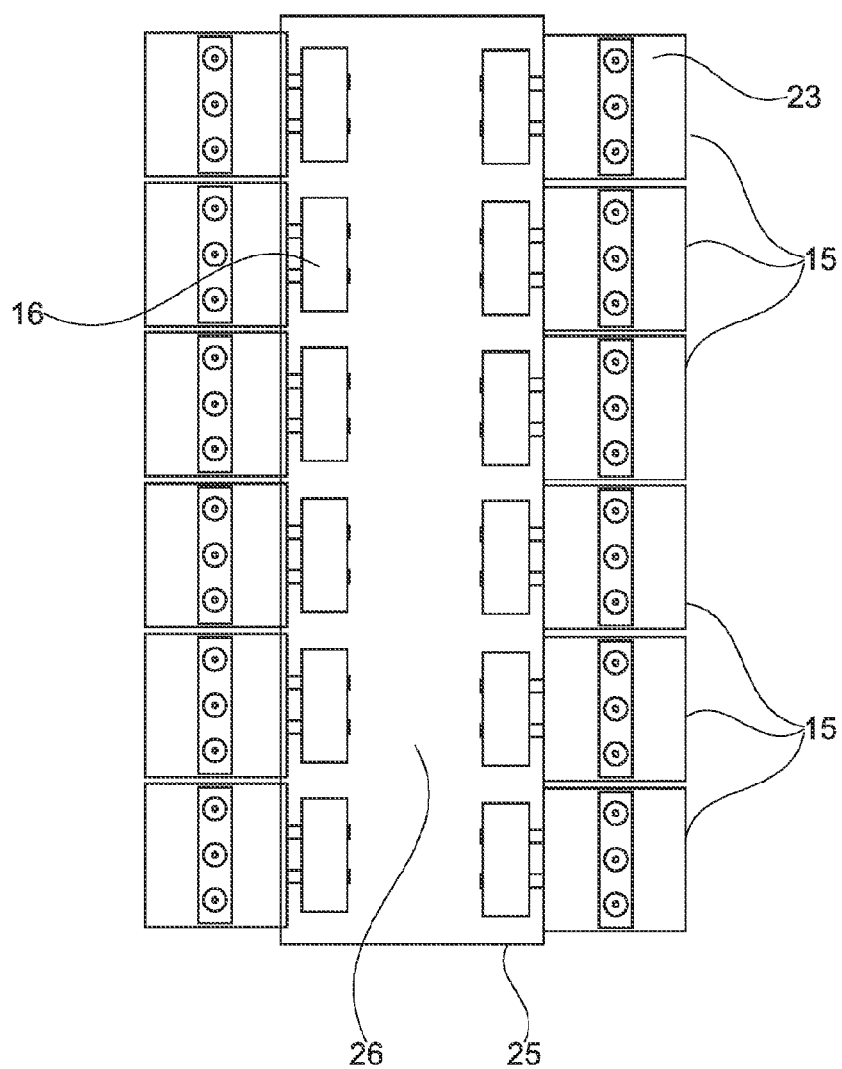
FIG. 11 is a top view of the preferred embodiment of 12 vertical storage towers constructed in a symmetrical network to create a middle internal workspace under a permanent roof structure which overlays the roofs of the vertical storage towers in a weatherproof, insulated and permanent architecture capable of satisfying building regulations requirement. For the avoidance of doubt either of the tower arrangements in FIG. 8 or 9 are suitable for use in this symmetrical network.

Referring to FIG. 11, a series of multiple growth towers 15a, each having a cover with one or more cooling and heating units 23 located thereon, are shown in parallel rows and arranged to create an internal workspace 26 by placing a roof structure 25 over the multiple processing hatches 16.

Thus according to a still further aspect the present invention provides a series of automated vertical storage towers, each of which is as defined hereinbefore, and wherein said series comprises multiple growth towers each having a cover with one or more cooling and heating units located thereon, wherein said towers are arranged in parallel rows to provide an internal workspace which is protected via a roof structure over the multiple processing hatches of said towers.

Figure 12:
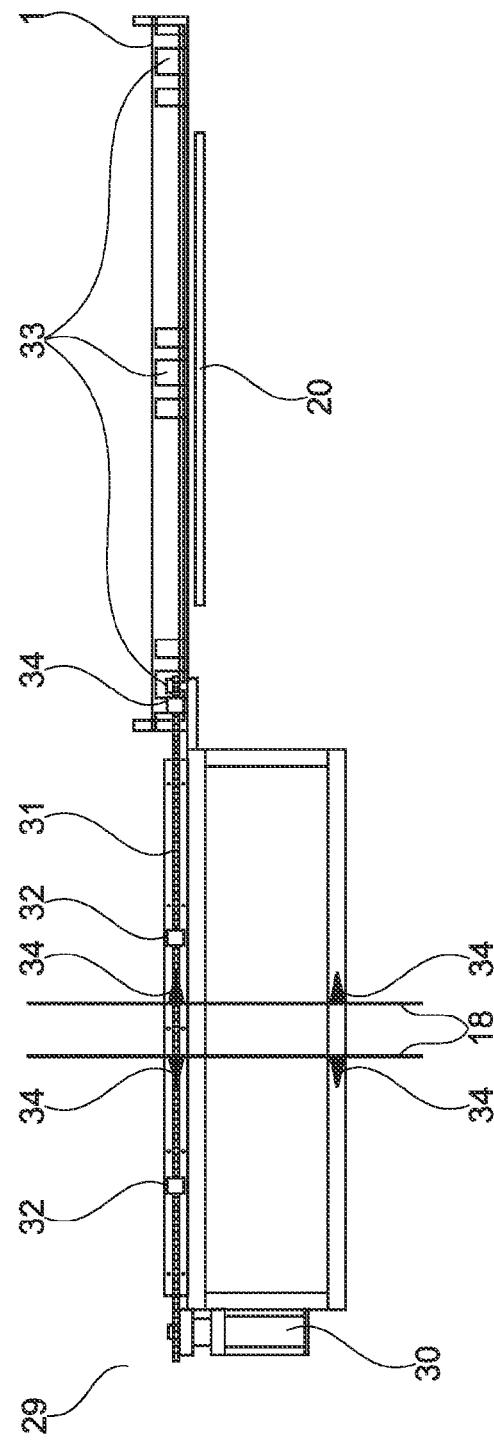
FIG. 12 is a side view of an embodiment of a single growth and lighting tray unit in accordance with an aspect of the invention and as illustrated in FIG. 3 as it is transferred between the storage position brackets and the vertical lift shaft by an automated transfer mechanism.

Referring to FIG. 12, the automated tray transfer mechanism unit 29 of the tower 15a, of FIG. 8 is shown in side view. This mechanism transfers tray unit 1 from the processing hatch 16 to a storage position within the tower, or retrieves tray unit 1 from its storage position within the tower and transfers it to the processing hatch for management, by activating the motor 30 wherein a chain 31 with a collection spigot 32 connects with the lugs 33 on the tray unit 1, in order to transfer the tray unit 1 onto said automated transfer mechanism 29. This mechanism including the tray unit 1 is lifted or lowered by the lift mechanism 18 to its new position at which point the tray unit 1 is then transferred by the automated transfer mechanism unit 29 to its new position.

Figure 13:
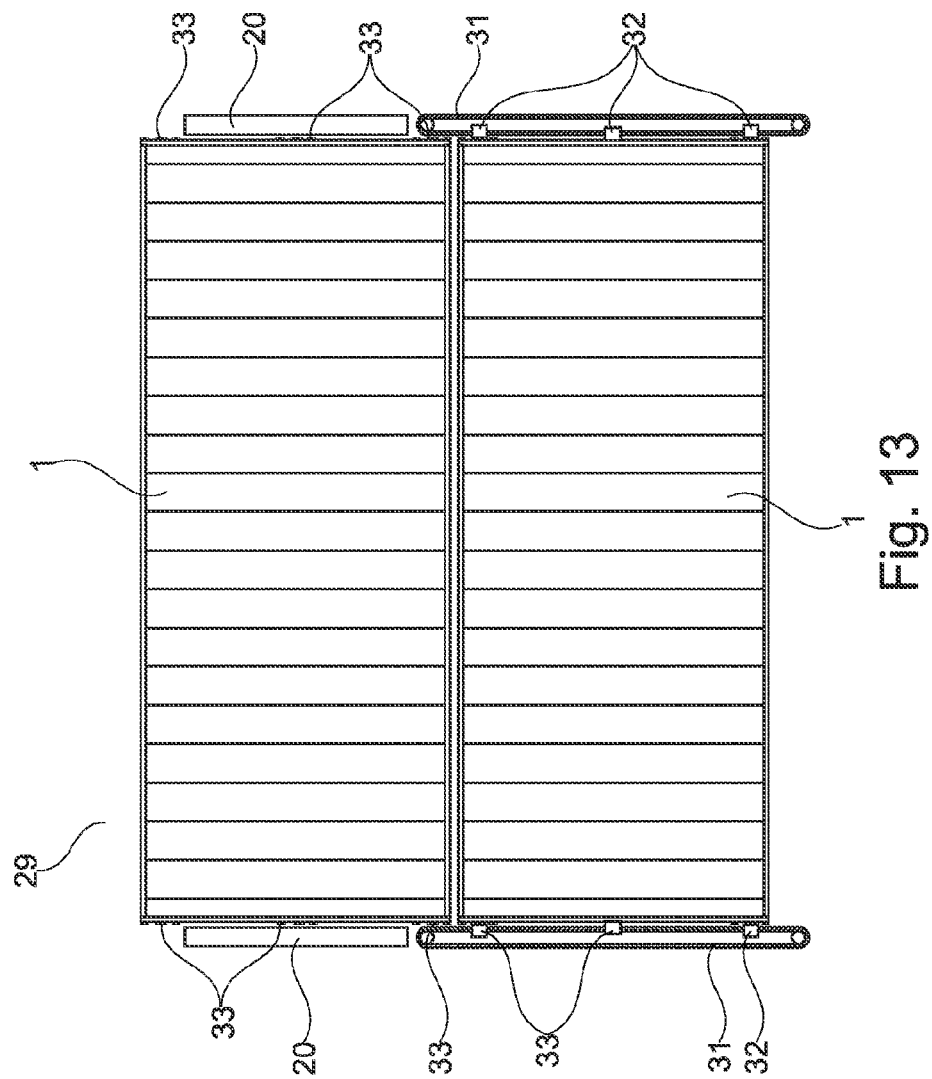
FIG. 13 is a top view of a single growth and lighting tray unit in accordance with an aspect of the invention and as illustrated in FIG. 3 as it is transferred between the storage position brackets and the vertical lift shaft by an automated transfer mechanism.

Referring to FIG. 13, the automated tray transfer mechanism unit 29 of FIG. 12 is shown in overhead view. This mechanism transfers tray unit 1 from either the processing hatch 16 (not shown) or its storage position within the tower (not shown) by activating the motor 30 (not shown) wherein a chain 31 with a collection spigot 32 connects with the lugs 33 on the unit 1 in order to transfer the tray unit 1 onto the automated transfer mechanism 29. This mechanism including the tray unit 1 is lifted or lowered by lift mechanism 18 to its new position at which the tray unit 1 is transferred by the automated transfer mechanism unit 29 to its new position.

Figure 14:
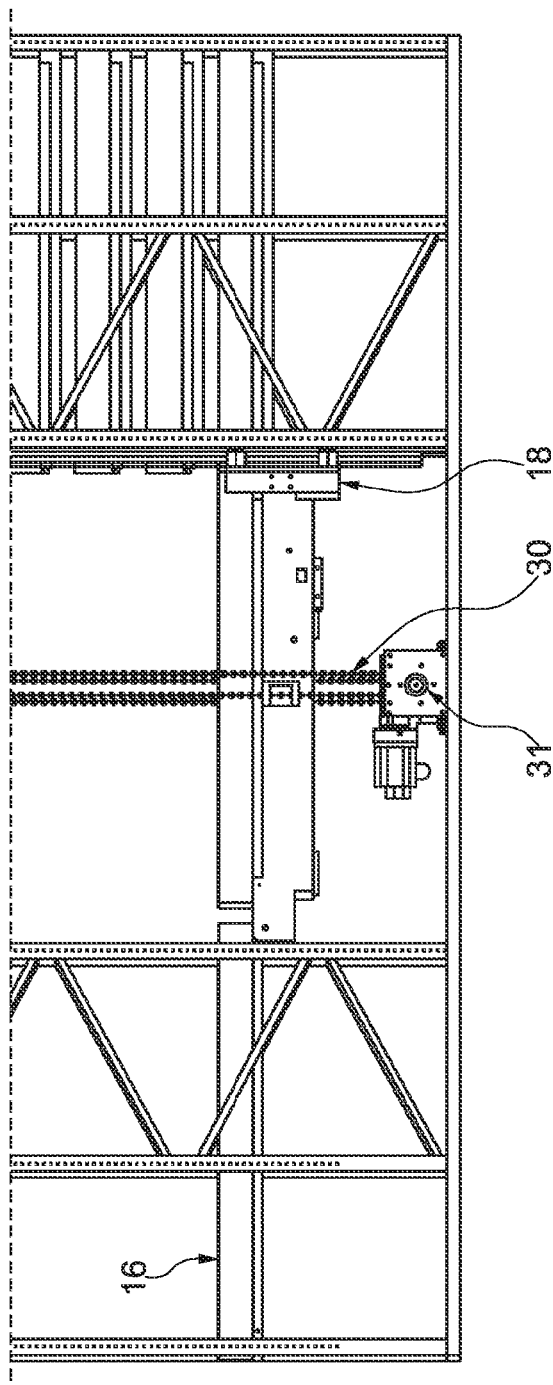
FIG. 14 is a side view of a preferred embodiment of a single growth and lighting tray unit in accordance with an aspect of the invention and as illustrated in FIG. 1 as it is transferred between the storage position brackets and the vertical lift shaft by an automated transfer mechanism in a tower arrangement according to FIG. 9.

Referring to FIG. 14 the automated tray transfer mechanism unit 29 of the tower 15b, of FIG. 9 is shown in side view. This mechanism transfers tray unit 1 from the processing hatch 16 to a storage position within the tower, or retrieves tray unit 1 from its storage position within the tower and transfers it to the processing hatch for management, by activating the motor 30 wherein a chain 31 with a collection spigot 32 (not shown) connects with the lug 33 on one side of the tray unit 1, in order to transfer the tray unit 1 onto said automated transfer mechanism 29. This mechanism including the tray unit 1 is lifted or lowered by the lift mechanism 18 to its new position at which point the tray unit 1 is then transferred by the automated transfer mechanism unit 29 to its new position.

Figure 15:
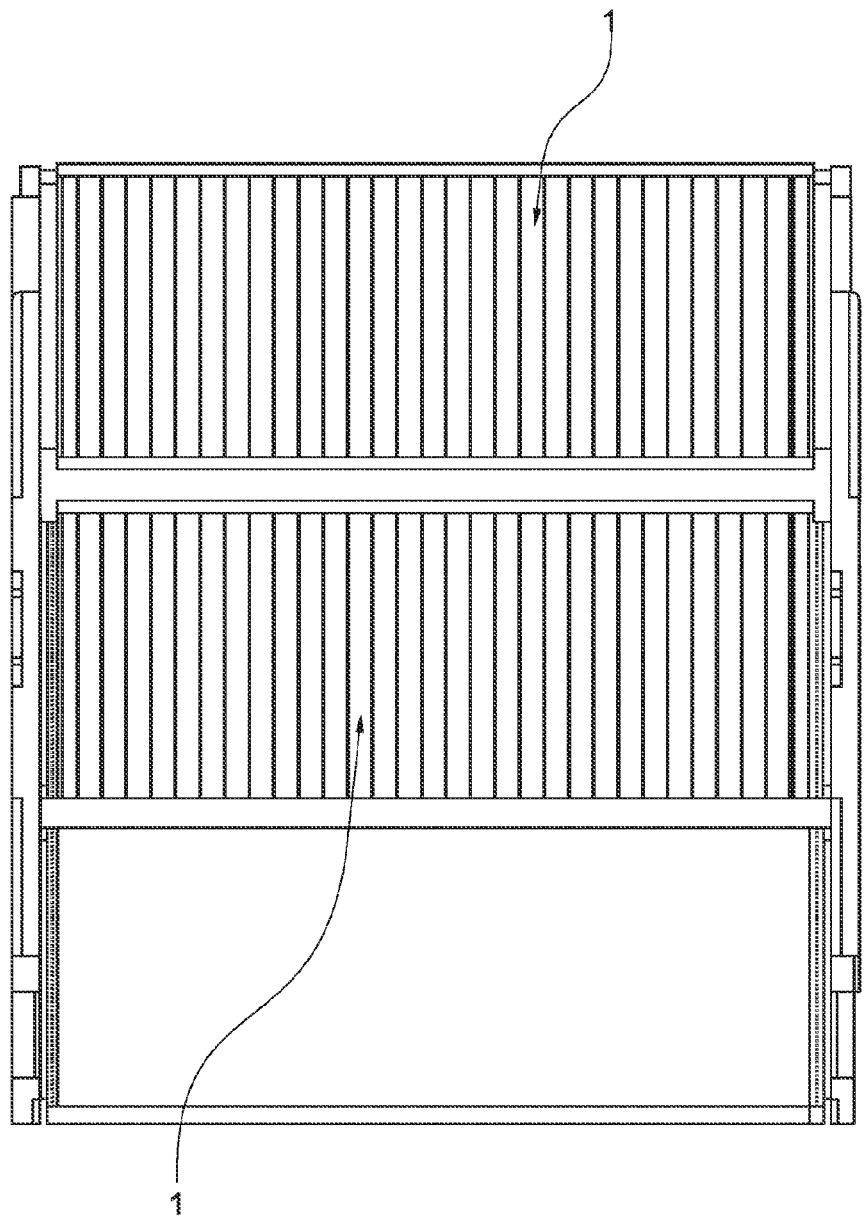
FIG. 15 is a top view of a single growth and lighting tray unit in accordance with an aspect of the invention and as illustrated in FIG. 1 as it is transferred between the storage position brackets and the vertical lift shaft by an automated transfer mechanism.

Referring to FIG. 15 is a top view of a single growth and lighting tray unit 1 in accordance with an aspect of the invention and as illustrated in FIG. 1 as it is transferred between the storage position brackets and the vertical lift shaft by an automated transfer mechanism. Referring to FIG. 15, the automated tray transfer mechanism unit 29 of FIG. 14 is shown in overhead view. This mechanism transfers tray unit 1 from either the processing hatch 16 (not shown) or its storage position within the tower (not shown) as described in FIG. 15. This mechanism including the tray unit 1 is lifted or lowered by lift mechanism 18 (not shown) to its new position at which the tray unit 1 is transferred by the automated transfer mechanism unit 29 (not shown) to its new position.

Figure 16:
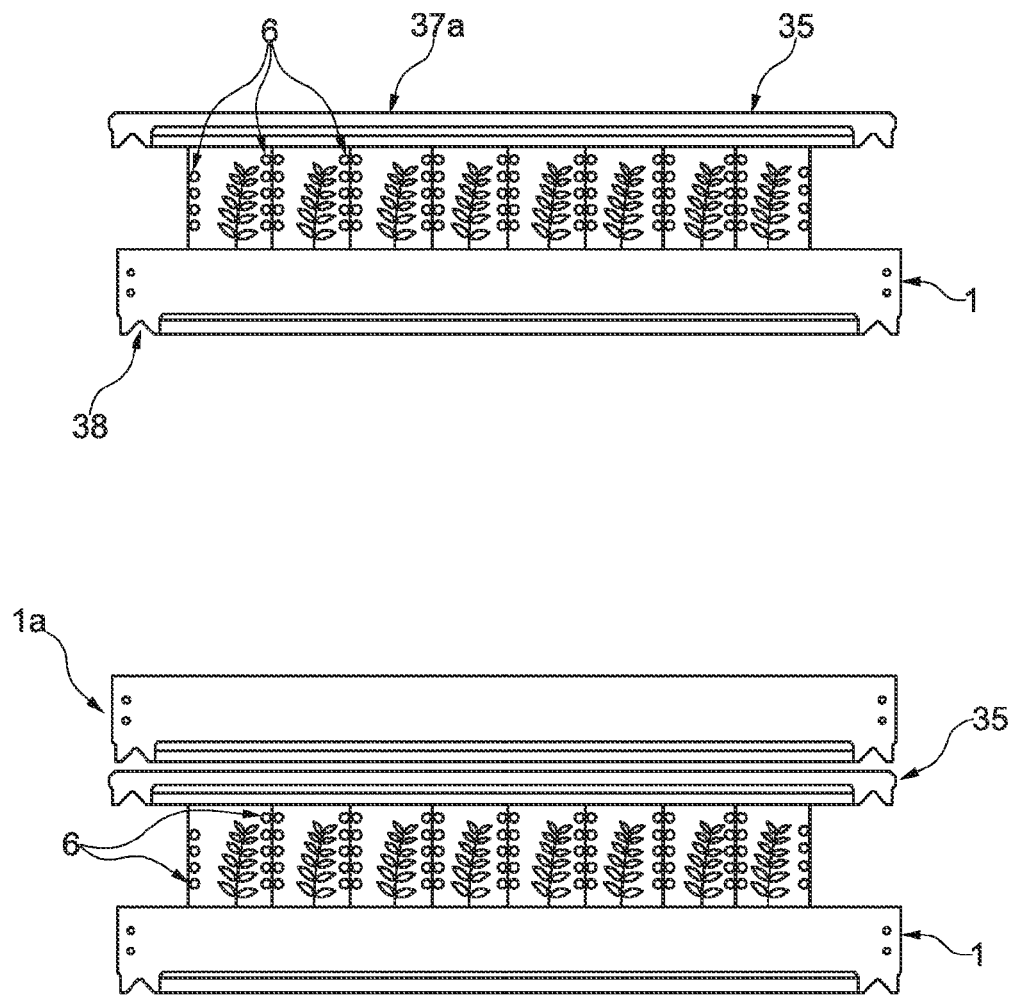
FIG. 16 is an exploded view of an alternative embodiment of a skeleton tray arrangement for the provision of vertical lighting for a vertical plant growth system.

Referring to FIG. 16 provides a front view of an alternative embodiment of combined growth and lighting arrangement suitable for use in the automated tower system herein. In FIG. 16(a) a skeleton tray 35 having a bottom edge 36, narrow sidewalls 37a and 37b (not shown) and a pair of lugs 38 at either end. The bottom edge 36 surrounds the base of the skeleton tray, which in turn supports an LED lighting arrangement. In FIG. 16 a number of LED lights are provided in a pendant (hanging) arrangement from the underside of the base of the skeleton tray in order to provide vertical lighting to plants in unit 1 below. As will be readily appreciated the skeleton tray may accommodate any suitable alternative LED arrangement as discussed herein. The LED lighting for use in skeleton trays is provided by printed circuit board (pcb) strips 6 each comprising a number of individual LEDs, are mounted onto the underside of the skeleton tray base, using any suitable means, and typically by use of adhesive thermal tape.

In FIG. 16(b) a combined growth and lighting unit comprising an upper unit 1a, a skeleton tray 36 and a lower unit 1b is illustrated. The upper unit 1a and/or the lower unit 1b may be a combined growth and lighting unit as detailed hereinbefore, and as illustrated and described in FIG. 1, or may be a growth unit without lighting. The skeleton tray is as described and illustrated in FIG. 16(a).

As will be readily appreciated the combined growth and lighting unit of FIG. 16(b) is suitable for use in the automated growth towers herein with the three units 1a, 36 and 1b being located throughout the growth tower in repeated formation.

As will also be readily appreciated the use of the skeleton tray arrangement provides enhanced flexibility for the growth of mixed systems, wherein a growth tower may include a number of combined growth and lighting units having a skeleton tray, such as for example in accordance with FIG. 16, and also a number of combined growth and lighting units without a skeleton tray, such as for example in accordance with FIGS. 1 and 3 herein.

Figure 17:
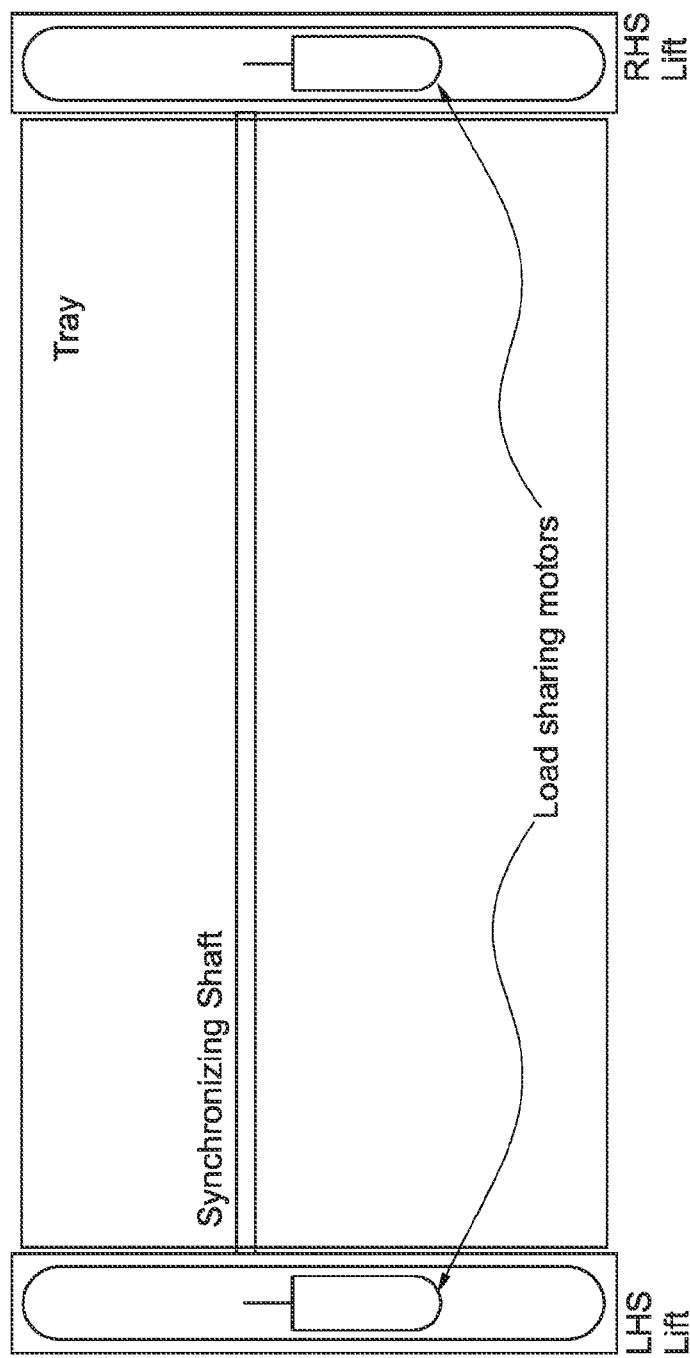
FIG. 17 is a side view of the synchronised dual-motor system.

Referring to FIG. 17, the lift weight shaft 35 synchronizes motors 36 and 37 at each side of the lift in the tower of FIG. 15a.

Figure 18:
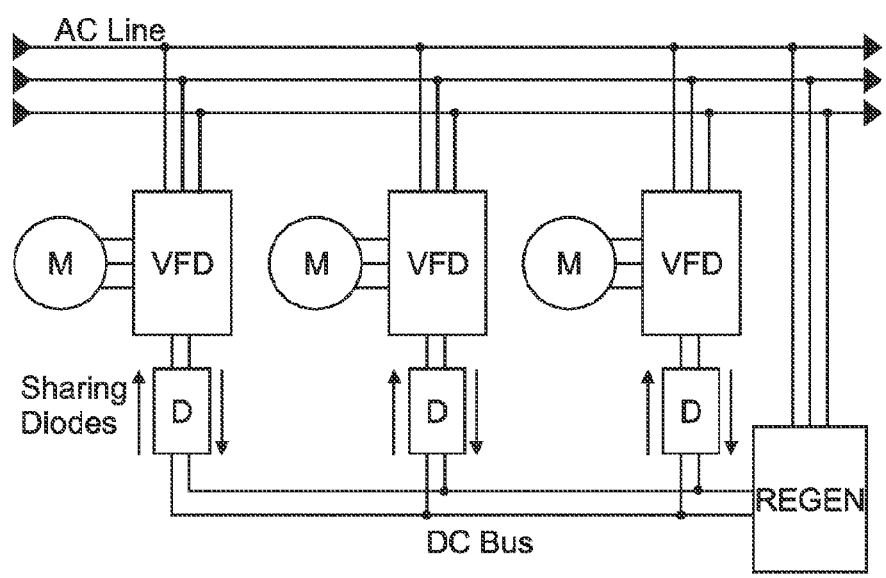
FIG. 18 is an illustration of the electrical regeneration system.

Referring to FIG. 18, the power regeneration system for use in the automated tower system herein is illustrated wherein the lift motor is utilised as a generator when lowering (retarding) trays. This energy is already generated into the inverter drive and is burned off as heat on a breaking resistor on the side of the electrical panel. Instead of burning the energy as heat, this energy is evenly distributed between machines directly without any need for further conversion of the electricity. A braking resistor is included to accommodate the situation where all the machines a required to be lowered at once, such as for routine maintenance or such like. An alternative means to provide for this scenario is to regenerate the power back to the mains.

Referring to FIG. 19, the electrical supply to the LED-containing pcb strips 6 is provided by a DC low voltage busbar 9 with positive connection 10 and negative connection 12 mounted along substantially the entire length of unit 1. Busbar 9 may be screwed onto the tray, or may be suitably mounted onto or embedded into the tray. A number of lugs 33 are provided at either end of the underside of the tray base 5.

The invention claimed is:

1. An automated multi-layer vertical growth storage tower suitable for growth and storage of plants with integrated growth trays comprising:
   two stacks of single tray units wherein the underside of each tray unit accommodates a lighting source compatible with plant growth,
   wherein the tray units are stored vertically within twin stacks,
   wherein the twin stacks are on either side of a central lift mechanism in the storage tower,
   wherein the tray units are mechanically transferred between a lift position and a storage position within the tower,
   wherein the tray units are automatically retrievable from the storage position to a management position wherein the management position is outside of the tower,
   wherein the management position is in alignment with central workstation(s), and
   wherein each central workstation comprises at least one opening on the outside of the tower for access to one or more tray units.

2. The automated tower of claim 1, comprising a low voltage DC light source.

3. The automated tower of claim 1, wherein the lighting source is provided by an LED light source.

4. The automated tower of claim 1, wherein the lighting source is located under each tray unit.

5. The automated tower of claim 1, comprising an LED light source on the underside of each tray unit and automatically activated when the tray unit is in the storage and growth position.

6. The automated tower of claim 1, comprising a low voltage LED light source on the underside of each tray unit and automatically activated when the tray unit is in the storage and growth position.

7. The automated tower of claim 1, comprising a low voltage DC LED light source on the underside of each tray unit wherein the LED light source includes an integral heat sink and operates at low voltage DC to enable variation of wavelength and intensity of light on a tray-to-tray basis.

8. The automated tower of claim 1, wherein the lighting source is located under each tray unit and is provided by a skeleton tray located intermediate between the underside of a first tray unit and a growth area of a second tray unit.

9. The automated tower of claim 1, wherein vertical spacing between each tray unit can be varied throughout the plant growth cycle and wherein the minimal vertical spacing between each tray unit is at least the height of the tray.

10. The automated tower of claim 1, having a lift weight shaft that synchronises motors at each side of the tower.

11. The automated tower of claim 1, further comprising a system for ventilation and cooling to control temperature, humidity and $CO_2$ levels.

12. A series of automated towers for use in plant growth wherein each tower in the series is an automated multi-layer vertical growth storage tower with integrated growth trays comprising:
   two stacks of single growth tray units wherein the underside of each tray accommodates a lighting source compatible with plant growth,
   wherein the tray units are stored vertically within the two stacks,
   wherein the stacks are on either side of a central lift mechanism in the storage tower,
   wherein the growth tray units are mechanically transferred between a lift position and a storage position within the tower,
   wherein the growth tray units are automatically retrievable from the storage position to a management position wherein the management position is outside of the tower,
   wherein than management position is in alignment with central workstation(s), and
   wherein each central workstation comprises at least one opening on the outside of the tower for access to one or more growth trays.

13. A plant growth system comprising one or more of the automated vertical storage towers of claim 1, each tower comprising integrated growth trays wherein the underside of each tray accommodates a lighting source compatible with plant growth and wherein said trays are stored vertically in twin stacks on either side of a central lift mechanism in each storage tower.

14. A process for growing plants comprising
   providing an automated multi-layer vertical growth storage tower with integrated growth trays for the provision of humidity and/or temperature controlled storage wherein the automated multi-layer vertical growth storage tower comprises:
   two stacks of single storage tray units wherein the underside of each tray can be adapted to accommodate a lighting source,
   wherein the tray units are stored vertically within the two stacks,
   wherein the stacks are on either side of a central lift mechanism in the storage tower,
   wherein the storage tray units are mechanically transferred between a lift position and a storage position within the tower,
   wherein the storage tray units are automatically retrievable from the storage position to a management position wherein the management position is outside of the tower,
   wherein the management position is in alignment with central workstation(s), and
   wherein each central workstation comprises at least one opening on the outside of the tower for access to one or more storage trays; and
   introducing at least one plant to the tower.

15. The process of claim 14, wherein the underside of each tray unit accommodates a lighting source and wherein said lighting is provided by an LED light source.

16. The process of claim 14, wherein a lighting source is located under each tray unit and is provided by means of a skeleton tray located intermediate between the underside of a first tray unit and the growth area of a second tray unit.

17. The process of claim 14, wherein the tower further comprises a system for ventilation and cooling to control temperature, humidity and $CO_2$ levels.

18. The process of claim 14, wherein the tower may provide heated or refrigerated storage conditions.

19. The process of claim 14, wherein the tower is fully automated.

* * * * *